United States Patent
Looney et al.

(10) Patent No.: US 12,087,319 B1
(45) Date of Patent: Sep. 10, 2024

(54) JOINT ESTIMATION OF ACOUSTIC PARAMETERS FROM SINGLE-MICROPHONE SPEECH

(71) Applicant: PINDROP SECURITY, INC., Atlanta, GA (US)

(72) Inventors: David Looney, Atlanta, GA (US); Nikolay Gaubitch, Atlanta, GA (US)

(73) Assignee: Pindrop Security, Inc., Atlanta, GA (US)

(*) Notice: Subject to any disclaimer, the term of this patent is extended or adjusted under 35 U.S.C. 154(b) by 252 days.

(21) Appl. No.: 17/079,082

(22) Filed: Oct. 23, 2020

Related U.S. Application Data

(60) Provisional application No. 62/925,349, filed on Oct. 24, 2019.

(51) Int. Cl.
 *G10L 25/30* (2013.01)
 *G06N 3/048* (2023.01)
 *G06N 3/08* (2023.01)

(52) U.S. Cl.
 CPC ........... *G10L 25/30* (2013.01); *G06N 3/048* (2023.01); *G06N 3/08* (2013.01)

(58) Field of Classification Search
 CPC ......... G10L 25/30; G10L 17/02; G10L 17/18; G10L 17/20; G10L 19/028; G06N 3/0481; G06N 3/08
 See application file for complete search history.

(56) References Cited

U.S. PATENT DOCUMENTS

| | | |
|---|---|---|
| 5,442,696 A | 8/1995 | Lindberg et al. |
| 5,570,412 A | 10/1996 | Leblanc |
| 5,724,404 A | 3/1998 | Garcia et al. |
| 5,825,871 A | 10/1998 | Mark |
| 6,041,116 A | 3/2000 | Meyers |
| 6,134,448 A | 10/2000 | Shoji et al. |
| 6,654,459 B1 | 11/2003 | Bala et al. |
| 6,735,457 B1 | 5/2004 | Link, II et al. |
| 6,765,531 B2 | 7/2004 | Anderson |
| 7,787,598 B2 | 8/2010 | Agapi et al. |
| 8,050,393 B2 | 11/2011 | Apple et al. |
| 8,223,755 B2 | 7/2012 | Jennings et al. |
| 8,311,218 B2 | 11/2012 | Mehmood et al. |

(Continued)

OTHER PUBLICATIONS

H. Schulzrinne et al., "RTP Payload for DTMP Digits, Telephone Tones, and Telephony Signals" Columbia University, Dec. 2006, <https://tools.ietf.org/html/rfc4733>.

(Continued)

*Primary Examiner* — Michael N Opsasnick
(74) *Attorney, Agent, or Firm* — Foley & Lardner LLP

(57) ABSTRACT

Embodiments described herein provide for end-to-end joint determination of degradation parameter scores for certain types of degradation. Degradation parameters include degradation describing additive noise and multiplicative noise such as Signal-to-Noise Ratio (SNR), reverberation time (T60), and Direct-to-Reverberant Ratio (DRR). Various neural network architectures are described such that the inherent interplay between the degradation parameters is considered in both the degradation parameter score and degradation score determination. The neural network architectures are trained according to computer generated audio datasets.

20 Claims, 9 Drawing Sheets

(56) References Cited

U.S. PATENT DOCUMENTS

| | | | |
|---|---|---|---|
| 8,385,888 B2 | 2/2013 | Labrador et al. | |
| 9,060,057 B1 | 6/2015 | Danis | |
| 9,078,143 B2 | 7/2015 | Rodriguez et al. | |
| 10,257,591 B2 | 4/2019 | Gaubitch | |
| 2002/0181448 A1 | 12/2002 | Uskela et al. | |
| 2003/0012358 A1 | 1/2003 | Kurtz et al. | |
| 2011/0051905 A1 | 3/2011 | Poels et al. | |
| 2011/0123008 A1 | 5/2011 | Sarnowski | |
| 2013/0151244 A1* | 6/2013 | Chen | G10L 25/69 704/205 |
| 2015/0120027 A1 | 4/2015 | Cote et al. | |
| 2015/0310875 A1* | 10/2015 | Rennies | G10L 21/0364 704/225 |
| 2016/0293185 A1 | 10/2016 | Cote et al. | |
| 2017/0222960 A1 | 8/2017 | Agarwal et al. | |
| 2017/0302794 A1 | 10/2017 | Spievak | |
| 2017/0359362 A1 | 12/2017 | Kashi et al. | |
| 2018/0068675 A1* | 3/2018 | Variani | G10L 19/008 |
| 2018/0082692 A1* | 3/2018 | Khoury | G10L 17/20 |
| 2018/0350379 A1* | 12/2018 | Wung | G10L 21/038 |
| 2019/0043491 A1* | 2/2019 | Kupryjanow | G10L 21/0208 |
| 2019/0333521 A1* | 10/2019 | Khoury | G10L 19/028 |

OTHER PUBLICATIONS

Notification of Transmittal of the International Search Report and the Written Opinion of the International Searching Authority issued in PCT/US2017/044849 dated Jan. 11, 2018.

Canadian Examination Report issued in Canadian Application No. 3,032,807 dated Oct. 16, 2019.

* cited by examiner

JOINT ESTIMATION OF ACOUSTIC PARAMETERS FROM SINGLE-MICROPHONE SPEECH

CROSS-REFERENCE TO RELATED APPLICATIONS

This application claims priority to U.S. Provisional Application No. 62/925,349, filed Oct. 24, 2019, which is incorporated by reference in its entirety.

This application is related to U.S. application Ser. No. 16/378,286, filed on Apr. 8, 2019, which is a continuation of U.S. application Ser. No. 15/600,625, filed May 19, 2017, which claims the benefit of U.S. Provisional Application. No. 62/370,135, filed Aug. 2, 2016, each of which are incorporated by reference in their entirety.

TECHNICAL FIELD

This application generally relates to systems and methods for intelligently determining degradation parameters indicating the severity of degradation on audio signals and uses of such determinations.

BACKGROUND

The acoustic environment from which an audio recording was captured and produced can be described or characterized according to certain parameters indicating the severity of degradation on an audio signal. These parameters are employed in computing operations associated with audio processing. Examples of such parameters include Signal-to-Noise Ratio (SNR), a measure of reverberation time (e.g., time needed for sound decay), and a parameter characterizing the early to late reverberation ratio (e.g., Direct-to-Reverberant Ratio (DRR), sound clarity at a given time interval, sound definition at a given time interval). The reverberation time for the acoustic environment can be characterized as the time for sound to decay by, for example, 60 dB or 30 dB (denoted as T60 or T30, respectively). The reverberation time can also be characterized as Early Decay Time (EDT), which is the time needed for the sound to decay by, for example, 10 dB. The early to late reverberation ratio can be characterized as the sound clarity at, for example, 50 ms or 80 ms (denoted as C50 or C80, respectively). The early to late reverberation ratio can also be characterized as the sound definition at, for example, 50 ms or 80 ms (denoted as D50 or D80, respectively). While accurate estimates of these parameters can be obtained using dedicated measurement tools, in real-world circumstances, measuring these parameters is often impractical for most speech and audio applications. Thus, it is desirable to determine the parameters directly from observed audio signals.

There are several algorithms available to determine each of these parameters individually. But these conventional approaches each suffer a common problem of bias in the parameter determination due to one or the other parameters. For example, conventional approaches to estimating the SNR in reverberation will yield inaccurate results with increasing values of T60 or decreasing values of DRR. As a result, it can be desirable to determine the parameters jointly.

SUMMARY

Disclosed herein are systems and methods capable of addressing the above-described shortcomings and may provide any number of additional or alternative benefits and advantages. Embodiments described herein provide for end-to-end neural networks that jointly determine degradation of parameter scores for types of degradation parameters, such as SNR, T60, and DRR, which quantify additive noise and multiplicative noise.

The neural network architectures described herein benefit from the inherent interplay between the degradation parameters when determining the degradation parameter scores. Considering the inherent interplay between the degradation parameters and determining the degradation parameter scores with respect to other degradation parameter scores results in improved accuracy of the determined degradation parameter scores over conventional approaches that calculate each degradation parameter score individually. The neural network may be trained to determine the degradation parameter scores according to training signals that include simulated audio datasets and/or audio signals stored in a corpus.

In an embodiment, a computer-implemented method for end-to-end acoustic degradation estimation from an audio signal comprises training, by a computer, a neural network architecture by applying the neural network architecture on a plurality of simulated audio signals having one or more types of degradation; receiving, by the computer, an input audio signal from a speaker; and generating, by the computer, a plurality of degradation parameter scores for the input audio signal based upon a plurality of degradation parameters corresponding to a type of degradation by applying the neural network architecture to the input audio signal.

In another embodiment, a system comprises a computing device comprising a processor and a non-transitory storage medium configured to store a plurality of computer program instructions that when executed by the processor: train a neural network architecture by applying the neural network architecture on a plurality of simulated audio signals having one or more types of degradation; receive an input audio signal originating from a speaker; and generate a plurality of degradation parameter scores for the input audio signal based upon a plurality of degradation parameters corresponding to a type of degradation by applying the neural network architecture to the input audio signal.

It is to be understood that both the foregoing general description and the following detailed description are exemplary and explanatory and are intended to provide further explanation of the invention as claimed.

BRIEF DESCRIPTION OF THE DRAWINGS

The present disclosure can be better understood by referring to the following FIGURES. The components in the FIGURES are not necessarily to scale, emphasis instead being placed upon illustrating the principles of the disclosure. In the FIGURES, reference numerals designate corresponding parts throughout the different views.

DETAILED DESCRIPTION

Figure 1A:
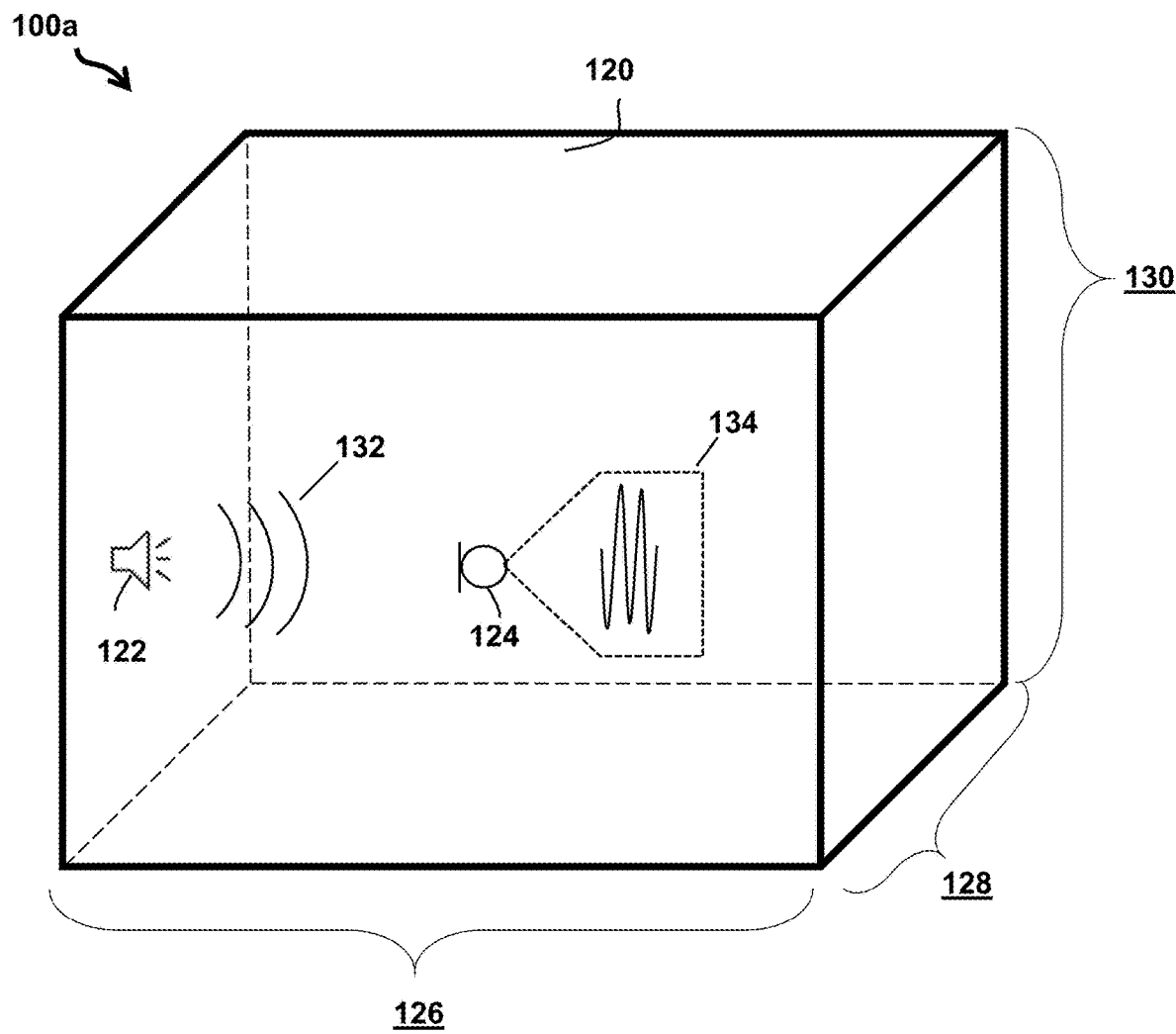
FIG. 1A shows a system for capturing audio data, according to an environment.

Reference will now be made to the illustrative embodiments illustrated in the drawings, and specific language will be used here to describe the same. It will nevertheless be understood that no limitation of the scope of the invention is thereby intended. Alterations and further modifications of the inventive features illustrated here, and additional applications of the principles of the inventions as illustrated here, which would occur to a person skilled in the relevant art and having possession of this disclosure, are within the scope of the invention.

Embodiments described herein provide for systems and methods for determining an amount of additive noise and reverberation that degrades an observed audio signal (sometimes referred to as "input audio signal") by estimating various parameters that are used to quantify the additive noise and reverberation degrading an audio wave as the audio wave propagates in an environment. The types of parameters may include, for example, SNR, T60, and DRR. Other parameters can be used in relation to the types of degradation. For instance, reverberation time may be quantified by T30 (the time for the sound to decay by 30 dB) or the early decay time (the time it takes for the impulse response to decay by 10 dB). The early to late reverberation ratio may be quantified by C50 (the ratio of the direct and reflected energy of the sound in the first 50 ms), C80 (the ratio of the direct and reflected energy of the sound in the first 80 ms), D50 (the ratio of the direct and total sound energy in the first 50 ms), D80 (the ratio of the direct and total sound energy in the first 80 ms).

Conventional approaches do not consider the advantages of determining these parameters jointly, taking into account the inherent interplay between these parameters. Further, some approaches determine the degradation parameters using handcrafted audio features, such as features that are determined separately from the determination of the degradation parameters. The embodiments described herein include end-to-end systems that seamlessly and jointly determine the degradation operating on the observed audio signal. Extracting features from the observed audio signal and injecting the features into a neural network architecture for the determination of the degradation score and degradation parameter scores are performed in a single process.

An audio wave is a physical representation of an audio signal. An audio wave may originate from a speaker (e.g., a human). The audio wave may transport audio data embedded in the audio signal through air. A degraded audio signal is an audio signal that has been affected by undesirable changes. As the audio wave moves through air (or other environmental physical medium), environmental features of the space can affect the audio wave, which could degrade the audio signal and ultimately degrade the audio data. Degraded audio data is undesirable in certain audio processing contexts, and particularly for speech-processing contexts. For example, systems or software programs that assess or rely upon interpreting speech audio signals, such as voice or speech processing operations, will be negatively affected by ingesting and analyzing the degraded audio signal. Identifying the severity of the degradation on the audio signal can improve the performance of such systems and software.

Generally, the severity of degradation can be determined by comparing a projected audio signal as transmitted by a target audio source (e.g., speaker speaking in a room, speaker speaking into an electronic device capable of converting audio waves into electrical signals) against an observed audio signal received at a receiver device (e.g., microphone, mobile device, electronic device capable of converting audio waves into electrical signals). The projected audio signal is transmitted via the audio wave to the receiver device such that the receiver device receives the projected audio signal as the observed audio signal. The observed audio signal contains the projected audio signal, including the speech originating from the target audio source (e.g., human speaker), in addition to noise (e.g., additive noise and multiplicative noise). The microphone receives and interprets the observed audio signal, which when received at the microphone is a continuous analog signal. The microphone (or other components of the receiver device coupled to the microphone) converts the observed audio signal from the analog signal to a digital audio signal (e.g., a discretized binary signal) by sampling the audio data captured and converted from the analog signal at a sampling rate ($f_s$) of a number of samples per second. The observed audio signal ($y_m(n)$), as interpreted by the microphone (m), is given with respect to the projected audio signal ($s(n)$) and degradations including additive noise ($v_m(n)$) and multiplicative noise ($h_m(n)$) by:

$$y_m(n)=s(n)*h_m(n)+v_m(n) \; y_m(n)s(n)*h_{m,d}(n)+s(n)*h_{m,r}(n)+v_m(n)$$

The additive noise (e.g., background noise) is a type of degradation that is added into the projected audio signal while traversing the environment, such as background noise and ambient noise. In some instances, the additive noise is already known, and the additive noise can be extracted from the observed audio signal.

Reverberation is a type of degradation caused by the acoustic features of the environment (e.g., the dimensions of the environment and the reflectiveness of the surfaces). The room acoustic response, the recording obtained when an ideal impulse is played in the room, can be used to simulate the impact of reverberation. Unlike the additive noise (e.g., background noise, ambient noise) that is added to the projected audio signal, the acoustic impulse response is convolved (*) with the projected audio signal, and is thus a kind of multiplicative noise. The acoustic impulse response comprises at least two components, a direct component ($h_{m,d}(n)$) and a reverberation component ($h_{m,r}(n)$), and is given by $h_m(n) \; h_{m,d}(n)+h_{m,r}(n)$. The direct component may include some strong early reflections on the projected audio wave when propagating directly to the microphone. The reverberation component represents interaction of the projected audio wave and reflections of the projected audio wave (sometimes called "reverberated audio wave") that have reflected off environmental objects.

The projected audio wave (containing the projected audio signal) may encounter one or more reverberated audio waves (each containing reverberated audio signals) as the projected audio wave propagates toward the microphone. The energy of the projected audio wave can be reduced while propagating through the air (or other medium) or when encountering objects in the environment. For example, when the projected audio wave encounters an object, some of the projected audio wave is reflected back into the environment as the reverberated audio wave, while some of the projected audio wave is absorbed by the object upon impact. Because the reverberated audio wave is created from the projected audio wave, the reverberated audio wave will often have similar features as the projected audio wave. The similarities of the reverberated audio wave and the projected audio wave can cause interference and/or amplification of the projected audio wave, thereby distorting the shape of the audio wave, modifying the projected audio signal, and ultimately altering or corrupting the underlying audio data.

The effect of the multiplicative noise on the projected audio wave is characterized by convolving the mathematical representation of the projected audio signal with the mathematical representation of the acoustic impulse response. The convolution operation represents a more uniform mixture or smearing of a first signal (such as the projected audio signal of a human speaking in a room) with a second signal (e.g., acoustic impulse response). The acoustic impulse response can be a simulated signal or a real audio signal recorded as the response to an impulse. Consequently, the reverberated audio wave and the multiplicative noise generally are not as simple to extract from the projected audio wave as the additive noise.

As mentioned, the severity of the degradation on the projected audio wave may be quantified using one or more degradation parameters such as SNR, T60, and DRR. The T60 and DRR degradation parameters are multiplicative noise parameters and the SNR parameter is an additive noise parameter.

SNR (signal-to-noise ratio) represents a ratio of the power of the projected audio wave (including reverberated audio waves) to the power of the background noise wave (physically representing the background noise signal) detected by the microphone. A positive ratio may indicate that the power of the observed audio signal is higher than the power of the background noise signal, suggesting that the projected audio signal may be distinguishable from the background noise signal. The observed audio signal is interpreted by the microphone and includes the additive noise and multiplicative noise affecting the projected audio wave. A negative ratio may indicate that the power of the observed audio signal is lower than the power of the background noise signal, suggesting that the projected audio signal may be indistinguishable from the background noise signal. The distance from the target audio source to the microphone may affect the SNR (indicated by a low SNR) because the projected audio wave loses power as the projected audio wave propagates to the microphone, increasing the chances that the background noise waves overwhelms the projected audio wave (including reverberated audio waves). For instance, speech in the projected audio signal interpreted at a microphone could be indistinguishable from the background noise. In contrast, a microphone placed close to the target audio source may have a higher SNR, indicating that the projected audio wave (including reverberated audio waves) have more power than the background noise waves. For instance, speech in the projected audio signal interpreted at a microphone may be distinguishable from the background noise.

T60 (a measure of the reverberation time) indicates the amount of time for energy of the reverberated audio wave to decay in the event the source of the reverberated audio signal (e.g., the projected audio signal) is abruptly shut off. More specifically, T60 is the measure of the time for the sound to decay by 60 dB once the source has been switched off. Other measures of reverberation time are possible. For instance, T30 denotes the time for the sound to decay by 30 dB, and early decay time is the time it takes for the impulse response to decay by 10 dB. The longer that the audio signal needs to decay, the greater the impact of reverberation will be.

DRR (direct-to-reverberant ratio) represents a ratio of the power of the direct-path signal (e.g., the projected audio signal) from the target audio source relative to the total power of the reflected and attenuated copies of the projected audio signal (e.g., any reverberated audio signals). A positive ratio indicates that the power of the direct-path signal (e.g., the projected audio signal) is higher than the power of the reverberated audio signals, suggesting that the projected audio signal is distinguishable from the reverberated audio signals. A negative ratio indicates that the power of the direct-path signal (e.g., the projected audio signal) is overwhelmed by the power of the reverberated audio signals, and the projected audio signal is no longer distinct from the reverberated audio signal, suggesting that the projected audio signal is likely to have been modified by the reverberated audio signals.

The systems and method described herein include neural network architectures that process the various forms of audio information to jointly determine the degradation parameters. There is an inherent interplay between the degradation parameters T60, DRR, and SNR. For example, the reverberation time (quantified by T60, for instance) depends on the dimensions of the environment and also the materials of the walls and other objects in the environment. DRR depends on the strength of the direct path between the target audio source and the microphone, which in turn depends on the energy of the target audio source, the distance between the target audio source and the microphone, and the reverberation time. Likewise, SNR depends on the distance between background noise sources and microphone relative to the target audio source. Not only do the degradation parameters depend on the same information, but also the degradation parameters depend on each other. For example, T60 and DRR are representations of the power of the reverberated audio signal and SNR requires the power of the reverberated audio signal in the determination of the SNR parameter. Joint determination of degradation parameter scores beneficially considers the effect of the degradation on the projected audio signal with respect to each of the degradation parameters.

The benefit of determining the degradation parameter scores jointly extends to the consideration of the degradation parameters jointly. For example, the joint consideration of the degradation parameters on the observed audio signal may provide improved insight into the severity of the degradation parameters on the observed audio signal as compared to considering the severity of the degradation parameters on the observed audio signal individually. For example, in the event of a high T60 parameter score and a low DRR parameter score, it may be determined that the observed audio signal is severely degraded. A high T60 parameter score indicates that the reverberated signal may take a long time to decay, and the low DRR parameter score indicates that power of the reverberated signal overwhelms the power of the audio signal. In contrast, a high T60 parameter score with a high DRR parameter score may indicate that degradation, while present, is less severe. This is because the high T60 parameter score indicates that the reverberated signal may take a long time to decay, but the high DRR parameter score indicates that the power of the audio signal overwhelms the power of the reverberated signal.

The systems and methods described herein may also perform pre-processing actions on the observed audio signal, before determining the degradation score and degradation parameter scores affecting speech in the observed audio signal. The pre-processing can begin by parsing the audio data of the observed audio signal into audio frames. Each audio frame has a window of a fixed-length or duration, where the length or duration of the audio frame may be determined by a user or dynamically determined by the receiver device or other device (e.g., backend server). For each frame, the pre-processing performs a scaling or normalization operation on the data of the audio frames so that the data occupies the range [−1, 1]. Each frame is then further segmented into overlapping sub-frames having a fixed duration, a portion of which overlaps with adjacent sub-frames in the time series.

The pre-processing applies a Fast Fourier Transform (FFT) operation on the audio data to transform the audio data from a time domain representation into a frequency domain or spectrogram representation. This transformation operation results in an array (Y) of dimensions $N_f \times N_t$ for each sub-frame; where $N_f$ denotes the length of the FFT operation and will vary depending on the sampling rate used when capturing the observed audio signal; and where $N_t$ denotes the resolution of the spectrogram in time (dictated by the selected frame size and the degree of overlap between the frames).

The embodiments described below are examples of systems and methods for determining an amount of degradation on the observed audio signal using an end-to-end neural network for a joint determination. For ease of description and understanding, the illustrative embodiments discussed below mention employing such technology in the context of telephony systems performing various voice biometric operations. It should be appreciated that the technology is not limited to such implementations, and may be employed for any number of uses that may benefit from improved recognition or mitigation of degradation on audio signals. For instance, certain aspects for determining or implementing degradation parameters discussed below may be implemented in the context of an Internet of Things (IoT) device that receives voice commands via a microphone, such as a smart speaker or personal assistant, or any other device that operates according to voice interface or that ingests voice commands or voice inputs. For example, the IoT device could perform various operations according to speaker commands. As another example, the device could receive and assess voice inputs from the speaker.

A. Components and Operations of Illustrative Systems

Example Enclosed Space Environment

FIG. 1A shows a system 100a capturing audio signals, according to an embodiment. The system 100a may comprise a target audio source 122 and a microphone 124 in an enclosed acoustic space 120. The enclosed acoustic space 120 represents the environment through which a projected audio wave 132 propagates from a target audio source 122 towards a microphone 124. The enclosed acoustic space 120 is defined by a length 126, a height 130, and a depth 128. It should be understood that the components of the system 100a are merely illustrative. Other embodiments may include additional or alternative components, or omit components, from those of the system 100a, but are still within the scope of this disclosure.

The target audio source 122 is a device or speaker that emits the projected audio wave 132 into the enclosed acoustic space 120. Non-limiting examples of target audio sources 122 include human speakers, cell phones, landlines, VOIP devices such as laptops, desktops, and the like. The projected audio wave 132 may include speech originating from a speaker target audio source 122.

The microphone 124 is any device or device component capable of capturing and interpreting the projected audio wave 132. When the audio wave 132 containing a particular audio signal is projected from the target audio source 122 (e.g., the particular audio signal containing speech originating from the speaker), the microphone 124 captures the projected audio wave 132 (e.g., using a diaphragm) and converts the projected audio signal to an observed audio signal 134 (e.g., containing speech from the speaker). It should be appreciated that embodiments may include any number of microphones 124 or other receiver devices. As the projected audio wave 132 (originating from the target audio source 122) propagates towards the microphone 124, degradation can affect the projected audio wave 132 if the projected audio wave 132 interacts with the features of the enclosed acoustic space 120 (e.g., boundaries, objects, background noise, ambient noise). As such, the observed audio signal 134 at the microphone will be a function of the degradation impacting the projected audio wave 132.

Components of Example System Capturing and Analyzing Audio Data

Figure 1B:
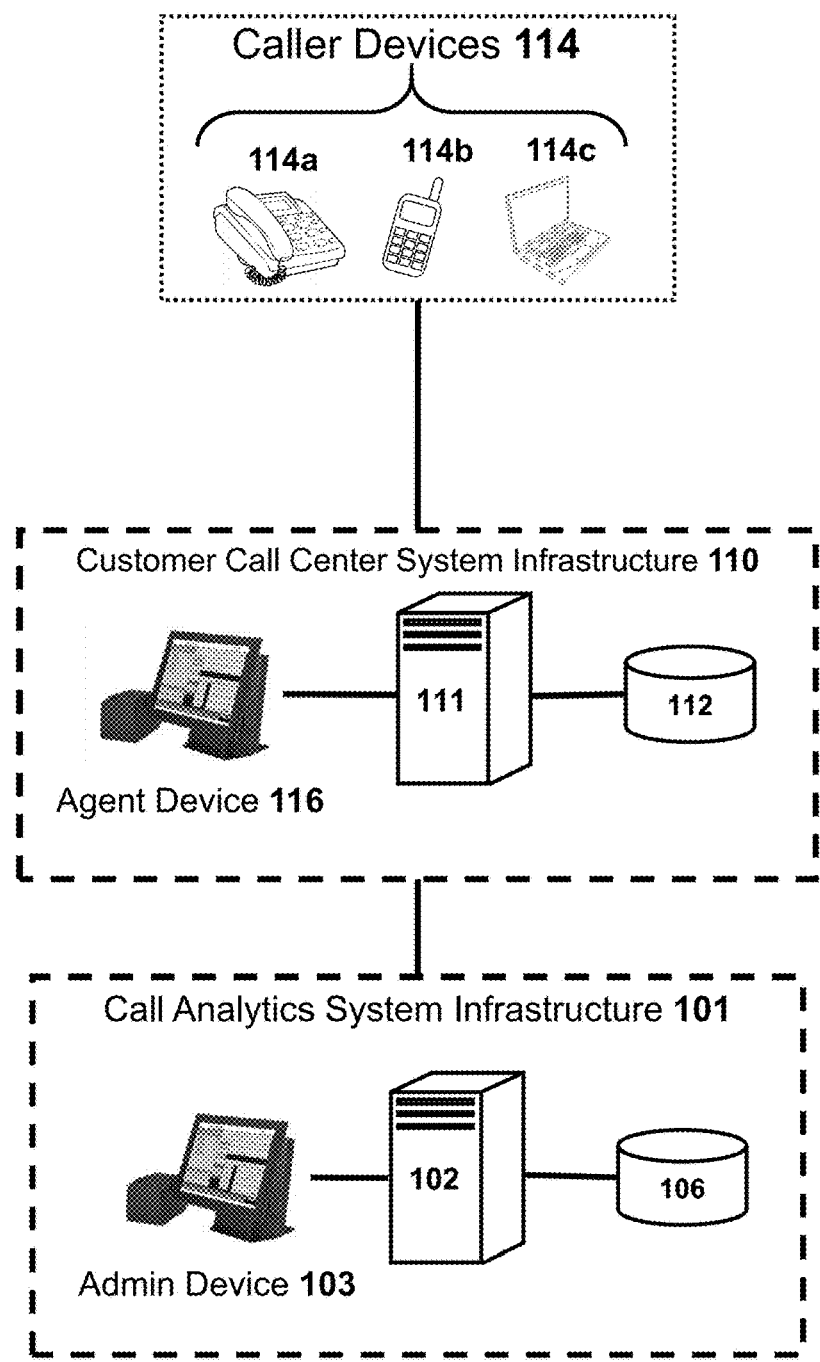
FIG. 1B shows a system for determining a degradation score and degradation parameter scores, according to an embodiment.

FIG. 1B shows components of a system 100b for receiving and analyzing telephone calls, according to an embodiment. The system 100b comprises a call analytics system 101, call center systems 110 of customer enterprises (e.g., companies, government entities, universities), and caller devices 114 (e.g., landline phone 114a, mobile phone 114b, and computing device 114c). The call analytics system 101 includes analytics servers 102, analytics databases 106, and admin devices 103. The call center system 110 includes call center servers 111, call center databases 112, and agent devices 116. Embodiments may comprise additional or alternative components or omit certain components from what is shown in FIG. 1B, yet still fall within the scope of this disclosure. It may be common, for example, for the system 100b to include multiple call center systems 110 or for the call analytics system 101 to have multiple analytics servers 102. It should also be appreciated that embodiments may include or otherwise implement any number of devices capable of performing the various features and tasks described herein. For example, the FIG. 1B shows the analytics server 102 in as a distinct computing device from the analytics database 106. In some embodiments, the analytics database 106 may be integrated into the analytics server 102, such that these features are integrated within a single device.

The system 100b describes an embodiment of speaker verification performed by the call analytics system 101 on behalf of a call center system 110. The speaker verification is based on the projected audio wave 132 captured by a microphone 124 of a calling device 114, which the analytics server 102 uses to perform various voice biometric operations. It should, however, be appreciated that any hardware and/or software system that processes audio signals to perform speaker recognition, speech recognition, or the like, could be considered an embodiment of the present disclosure.

The various components of the system 100b may be interconnected with each other through hardware and software components of one or more public or private networks. Non-limiting examples of such networks may include: Local Area Network (LAN), Wireless Local Area Network (WLAN), Metropolitan Area Network (MAN), Wide Area Network (WAN), and the Internet. The communication over the network may be performed in accordance with various communication protocols, such as Transmission Control Protocol and Internet Protocol (TCP/IP), User Datagram Protocol (UDP), and IEEE communication protocols. Likewise, the caller devices 114 may communicate with callees (e.g., call center systems 110) via telephony and telecommunications protocols, hardware, and software capable of hosting, transporting, and exchanging audio data associated with telephone calls. Non-limiting examples of telecommunications hardware may include switches and trunks, among other additional or alternative hardware used for hosting, routing, or managing telephone calls, circuits, and signaling. Non-limiting examples of software and protocols for telecommunications may include SS7, SIGTRAN, SCTP, ISDN, and DNIS among other additional or alternative software and protocols used for hosting, routing, or managing telephone calls, circuits, and signaling. Components for telecommunications may be organized into or managed by various different entities, such as, for example, carriers, exchanges, and networks, among others.

The call analytics system 101 and the call center system 110 are network system infrastructures 101, 110 comprising physically and/or logically related collections of software and electronic devices managed or operated by various enterprise organizations. The devices of each network system infrastructure 101, 110 are configured to provide the intended services of the particular enterprise organization.

The call analytics system 101 is operated by a call analytics service that provides various call management, security, authentication (e.g., speaker verification), and analysis services to customer organizations (e.g., corporate call centers, government entities). Components of the call analytics system 101, such as the analytics server 102, execute various processes using audio data in order to provide various call analytics services to the organizations that are customers of the call analytics service. In operation, a caller uses a caller device 114 to originate a telephone call to the call center system 110. The microphone 124 of the caller device 114 observes the caller's speech (projected audio waves 132) and generates the audio data represented by the observed audio signal 134. The caller device 114 transmits the audio data for the observed audio signal 134 to the call center system 110. The interpretation, processing, and transmission of the audio data may be performed by components of telephony networks and carrier systems (e.g., switches, trunks), as well as by the caller devices 114. The call center system 110 then transmits the call analytics system 101 to perform various analytics and downstream audio processing operations.

The call center system 110 is operated by an enterprise organization (e.g., corporation, government entity) that is a customer of the call analytics service. In operation, the call center system 110 receives the audio data and/or the observed audio signal 134 associated with the telephone call from the caller device 114. The audio data may be received and forward by one or more devices of the call center system 110 to the call analytics system 101 via one or more networks. For instance, the customer may be a bank that operates the call center system 110 to handle calls from consumers regarding accounts and product offerings. Being a customer of the call analytics service, the bank's call center system 110 forwards the audio data associated with the inbound calls from consumers to the call analytics system 101, which in turn performs various processes using the audio data, such as determining a degradation score and/or degradation parameter scores of the inbound calls on behalf of the bank, performing speaker recognition, performing speaker authentication, among other voice and audio processing services. It should be appreciated that call center servers 111, call center databases 112 and agent devices 116 may each include or be hosted on any number of computing devices comprising a processor and software and capable of performing various processes described herein.

The caller device 114 may be any communications or computing device the caller operates to place the telephone call to the call destination (e.g., the call center system 110). Non-limiting examples of caller devices 114 may include landline phones 114a and mobile phones 114b. It should be appreciated that the caller device 114 is not limited to telecommunications-oriented devices (e.g., telephones). As an example, the calling device 114 may include an electronic device comprising a processor and/or software, such as a computing device 114c or Internet of Things (IoT) device, configured to implement voice-over-IP (VoIP) telecommunications. As another example, the caller device 114c may be an electronic IoT device (e.g., voice assistant device, "smart device") comprising a processor and/or software capable of utilizing telecommunications features of a paired or otherwise networked device, such as a mobile phone 114b.

Generally, when the caller places the telephone call to the call center system 110, the caller device 114 instructs components of a telecommunication carrier system or network to originate and connect the current telephone call to the call center system 110. When the inbound telephone call is established between the caller device 114 and the call center system 110, a computing device of the call center system 110, such as a call center server 111 or agent device 116 forwards the observed audio signal 134 (and/or audio data sampled using components in the calling device 114 from the observed audio signal 134) received at the microphone 124 of calling device 114 to the call analytics system 101 via one or more computing networks.

The analytics server 102 of the call analytics system 101 may be any computing device comprising one or more processors and software, and capable of performing the various processes and tasks described herein. The analytics server 102 may host or be in communication with the analytics database 106, and receives and processes the audio data from the one or more call center systems 110. Although FIG. 1B shows only single analytics server 102, it should be appreciated that, in some embodiments, the analytics server 102 may include any number of computing devices. In some cases, the computing devices of the analytics server 102 may perform all or sub-parts of the processes and benefits of the analytics server 102. The analytics server 102 may comprise computing devices operating in a distributed or cloud computing configuration and/or in a virtual machine configuration. It should also be appreciated that, in some embodiments, functions of the analytics server 102 may be partly or entirely performed by the computing devices of the call center system 110 (e.g., the call center server 111).

In operation, the analytics server 102 may execute various software-based processes on observed audio signal 134, including generating the degradation score and the degradation parameter scores. The operations of the analytics server 102 may include, for example, receiving the observed audio signal 134 associated with the calling device 114, parsing the observed audio signal 134 into frames and sub-frames, and processing the speech portions of the observed audio signal 134 (e.g., executing exponentiation operations indicating speech decay; generating feature maps; executing the neural network architecture for determining the severity of degradation), among other operations. In particular, the analytics server 102 executes a neural network architecture to jointly determine the degradation parameter scores for the inbound call forwarded from the call center system 110 or received directly from the calling device 114. The degradation parameter scores generated by the analytics server 102 are estimates of the various types of degradation parameters affecting the observed audio signal 134. The analytics server 102 uses the degradation parameters to determine the degradation score for the inbound call, which indicates the severity of degradation on the observed audio signal 134 associated with the inbound call.

The architecture of the neural network executed by the analytics server 102 may include, for example, an input layer, one or more high-level data extraction representation layers (e.g., one or more convolutional layers, one or more pooling layers), and one or more dense layers. The input layer may ingest the audio data of the observed audio signal 134. The analytics server 102 uses the input layer to feed the ingested audio data to various high-level data-extraction representation layers. The convolutional layer(s) extracts and/or evaluates the features of the ingested audio data by applying various convolution operations. The pooling layer(s) then detect and/or evaluate the features of the audio data. By applying the neural network to the audio data associated with the inbound call, the analytics server 102 can determine the degradation parameters in real-time by extracting certain features from an array representing the ingested audio data. The analytics server 102 applies the one or more dense layers to identify relationships between the extracted features in the audio data, allowing the analytics server 102 to determine the degradation parameter scores based on the extracted features. The analytics server 102 then generates and outputs the degradation parameter scores for each type of degradation parameter. The analytics server 102 may further generate a single, combined degradation score for the observed audio signal 134 based on the degradation parameter scores, where a downstream application expects or evaluates a single degradation score rather than the individual degradation parameter scores. For example, a downstream operation that verifies the identity of the caller or performs an action in response to spoken command (e.g., speech recognition) could generate a confidence score based on the one or more degradation parameter scores or the degradation score, where the confidence score indicates a level of confidence for the accuracy of the speech recognition and/or speaker identification.

In some implementations, at some point prior to feeding the audio data into the one or more dense layers, analytics server 102 executes one or more layers of the neural network that perform a flattening operation on the extracted features of the audio data. These layers flatten the extracted features of the audio data by arranging the features into one-dimensional vectors fed into the one or more dense layers.

The analytics server 102 trains the neural network to determine the degradation parameter scores using training audio signals, which may be previously received observed audio signals 134, simulated audio signals, clean audio signals. The training audio signals can be stored in one or more corpora that the analytics server 102 references during training. The training audio signals received from each corpus are each associated with a label indicating the known degradation parameter scores for the particular training audio signal. The analytics server 102 references these labels to determine a level of error during training.

The analytics server 102 trains the neural network based on inputs (e.g., training audio signals), predicted outputs (e.g., calculated degradation parameter scores), and expected outputs (e.g., labels associated with the training audio signals). The training audio signal is fed to the neural network, which the neural network uses to generate a predicted output (e.g., predicted degradation parameter scores) by applying the current state of the neural network on the training audio signal. The analytics server 102 references and compares the label associated with the training audio signal (e.g., expected degradation parameter scores) against the predicted parameter scores generated by the current state of the neural network to determine the amount of error or differences. The analytics server 102 tunes weighting coefficients of one or more neural network layers to reduce the amount of error, thereby minimizing the differences between (or otherwise converging) the predicted output and the expected output.

The training audio signals can include any number of clean audio signals that are audio recordings or audio signals having little or no noise, which the analytics server 102 may receive from the corpus (e.g., a speech corpus). The clean audio signal may include speech originating from a speaker. The training audio signals can include any number of audio recordings containing additive noise (e.g., background or ambient noise).

The analytics server 102 may further generate training audio signals, to simulate clean or noisy audio signals for training purposes. In operation, the analytics server 102 applies simulated audio signals (containing simulated degradations) to real speech recordings. The corpora containing examples of additive noise and/or multiplicative noise will often have a limited number of recordings or variations. Consequently, there is a need for the analytics server 102 to simulate audio signals to generate one or more training audio signals, which can simulate multiplicative noise (e.g., by convolving a clean audio signal containing speech with a simulated acoustic impulse response) and additive noise (e.g., background noise).

The analytics server 102 may generate training audio signals that simulate additive noise by degrading clean audio signals containing speech using simulated white Gaussian noise or other simulated noise with different spectral shapes, and/or example sources of background noise, thereby increasing the number of example sources of background or ambient noise that cause additive noise. The example sources of background or ambient noise may include real babble noise and real white noise, among other sources (e.g., HVAC/fans). The analytics server 102 generates the simulated training signal by applying the additive noise recording to the clean audio signal, thereby distorting or degrading the clean audio signal. The white Gaussian noise represents an audio signal having an equal energy distribution across the energy spectrum, mimicking the real-world effect of random white noise on waveforms. The analytics server 102 generates the simulated training signal by applying the white Gaussian noise to the clean audio signal, thus distorting or degrading the clean audio signal. Each simulated audio signal is then stored along with labels representing the known degradation parameter scores applied to generate the particular simulated audio signal.

Additionally or alternatively, the analytics server 102 may generate training audio signals that simulate multiplicative noise by degrading clean audio signals containing speech using simulated acoustic impulse responses, thereby increasing the diversity of examples of multiplicative noise. The analytics server will generate acoustic impulse responses to simulate varied room sizes, positions of the target audio source, and positions of the microphones. Each simulated audio signal is then stored along with the labels representing the known degradation parameter scores applied to generate the particular simulated audio signal. As an example, the analytics server 102 generates simulated acoustic impulse responses using an image-source method or modified image-source method that generates the acoustic impulse response based on sending and receiving audio waves in controlled circumstances and known degradation parameters. In some cases, the analytics server 102 generates the simulated training audio signals so as to train a specific type of degradation parameter. In such cases, the analytics server 102 applies constraints to the process of generating impulse responses, to control for and mitigate the ordinary inherent interplay between the degradation parameters.

The analytics server 102 may perform various pre-processing operations on the observed audio signal 134 during deployment. The analytics server 102 may also perform one or more pre-processing operations on the training audio signals (e.g., clean audio signals, simulated audio signals). The pre-processing operations can advantageously improve the speed at which the analytics server 102 operates or reduce the demands on computing resources when applying the neural network on the observed audio signal 134 or training audio signals.

During pre-processing, the analytics server 102 parses the observed audio signal 134 into audio frames containing portions of the audio data and scales the audio data embedded in the audio frames. The analytics server 102 further parses the audio frames into overlapping sub-frames. The frames may be portions or segments of the observed audio signal 134 having a fixed length across the time series, where the length of the frames may be pre-established or dynamically determined. The sub-frames of a frame may have a fixed length that overlaps with adjacent sub-frames by some amount across the time series. For example, a one-minute observed audio signal could be parsed into sixty frames with a one-second length. Each frame may be parsed into four 0.25 sec sub-frames, where the successive sub-frames overlap by 0.10 sec.

The analytics server 102 may transform the audio data into a different representation during pre-preprocessing. The analytics server 102 initially generates and represents the observed audio signal 134, frames, and sub-frames according to a time domain. The analytics server 102 transforms the sub-frames (initially in the time domain) to a frequency domain or spectrogram representation, representing the energy associated with the frequency components of the observed audio signal 134 in each of the sub-frames, thereby generating a transformed representation. In some implementations, the analytics server 102 executes a Fast-Fourier Transform (FFT) operation of the sub-frames to transform the audio data in the time domain to the frequency domain. For each frame (or sub-frame), the analytics server 102 performs a simple scaling operation so that the frame occupies the range [−1, 1] of measurable energy.

In some implementations, the analytics serve 102 may employ a scaling function to accentuate aspects of the speech spectrum (e.g., spectrogram representation). The speech spectrum, and in particular the voiced speech, will decay at higher frequencies. The scaling function beneficially accentuates the voiced speech. The analytics server 102 may perform an exponentiation operation on the array resulting from the FFT transformation. An example of the exponentiation operation performed on the array (Y) may be given by $Y_e = Y^\alpha$, where $\alpha$ is the exponentiation parameter. The values of the exponentiation parameter may be any value greater than zero and less than or equal to one (e.g., $\alpha=0.3$). The analytics server 102 feeds the outputs of the exponentiation operation into an input layer of the neural network architecture. In some cases, these outputs are further scaled as required for the input layer.

The degradation parameter scores and/or the degradation score determined by the analytics server 102, will be forwarded to or otherwise referenced by one or more downstream applications to perform various types audio and voice processing operations that assess or rely upon the neural network output (e.g., degradation parameter scores). The downstream application may be executed by the call center server 111, the analytics server 102, the admin device 103, the agent device 116, or any other computing device. Non-limiting examples of the downstream applications or operations may include speaker verification, speaker recognition, speech recognition, voice biometrics, audio signal correction, or degradation mitigation (e.g., dereverberation), and the like.

The degradation parameter scores may improve the accuracy and performance of the downstream software application. For instance, downstream speech recognition operation is less likely to misinterpret a high quality audio signal (less degraded) than a low quality signal (more degraded). In operation, the downstream application could reference the degradation parameter scores to mitigate the effects of the degradation on the observed audio signal 134 (e.g., a dereverberation process) or adjust certain operational configurations of the downstream application to control for and adapt to the known severity of the degradation, among other degradation mitigation processes.

The call center server 111 of a call center system 110 executes software processes for managing a call queue and/or routing calls made to the call center system 110, which may include routing calls to the appropriate call center agent devices 116 based on the caller's comments. The call center server 111 can capture, query, or generate various types of information about the call, the caller, and/or the calling device 114 and forward the information to the agent device 116, where a GUI on the agent device 116 is then displayed to the call center agent. The call center server 111 also transmits the information about the inbound call to the call analytics system 101 to preform various analytics processes, including the observed audio signal 134 and any other audio data. The call center server 111 may transmit the information and the audio data based upon a preconfigured triggering conditions (e.g., receiving the inbound phone call), instructions or queries received from another device of the system 100b (e.g., agent device 116, admin device 103, analytics server 102), or as part of a batch transmitted at a regular interval or predetermined time.

The analytics database 106 and/or the call center database 112 may contain any number of corpora that are accessible to the analytics server 102 via one or more networks. The analytics server 102 may access a variety of corpora to retrieve clean audio signals, previously received audio signals, recordings of background noise, and acoustic impulse response audio data. The analytics database and/or call center database 112 may contain any number of corpora that are accessible to the analytics server 102 via one or more networks. The analytics database 106 may also query an external database (not shown) to access a third-party corpus of clean audio signals containing speech or any other type of training signals (e.g., example noise).

The analytics database 106 and/or the call center database 112 may store information about speakers or registered callers as speaker profiles. A speaker profile are data files or database records containing, for example, audio recordings of prior audio samples, metadata and signaling data from prior calls, a trained model or speaker vector employed by the neural network, and other types of information about the speaker or caller. The analytics server 102 may query the profiles when executing the neural network and/or when executing one or more downstream operations. For example, when the analytics server 102 performs a downstream voice biometric operation to authenticate the caller, the analytics server 102 could determine a confidence value (retrieved from a table specifying a range of degradation scores associated with a profile in the call analytics database 106 and/or call center database 112) based on the degradation score of the inbound call. The profile could also store the registered feature vector for the registered caller, which the analytics server 102 references when determining a similarity score between the registered feature vector for the registered caller and the feature vector generated for the current caller who placed the inbound phone call.

In some implementations, the analytics database 106 and/or the call center database 112 stores initialized degradation parameter scores for use by the analytics server 102 during the training phase (or deployment phase) of the neural network. The initialized degradation parameter scores may be determined by users (e.g., using admin devices 103 or agent devices 116) or dynamically determined by the analytics server 102 (e.g., previous degradation parameter scores from particular callers or groups of callers, generated randomly, generated pseudo-randomly).

The admin device 103 of the call analytics system 101 is a computing device allowing personnel of the call analytics system 101 to perform various administrative tasks or user-prompted analytics operations. The admin device 103 may be any computing device comprising a processor and software, and capable of performing the various tasks and processes described herein. Non-limiting examples of the admin device 103 may include a server, personal computer, laptop computer, tablet computer, or the like. In operation, the user employs the admin device 103 to configure the operations of the various components of the call analytics system 101 or call center system 110 and to issue queries and instructions to such components.

The agent device 116 of the call center system 110 may allow agents or other users of the call center system 110 to configure operations of devices of the call center system 110. For calls made to the call center system 110, the agent device 116 receives and displays some or all of the relevant information associated with the call routed from the call center server 111.

B. Illustrative Method for Determining Degradation Parameters

Figure 2:
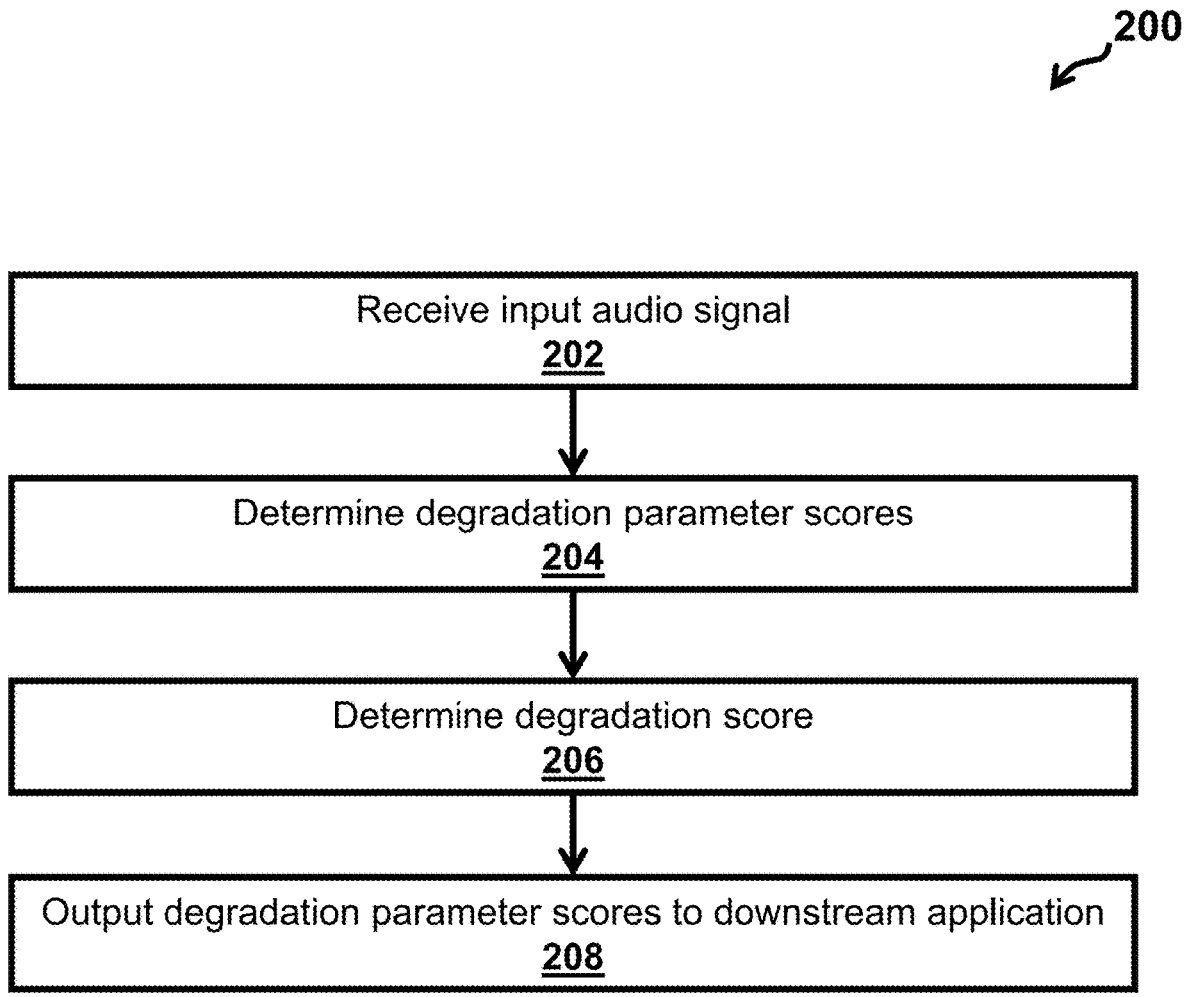
FIG. 2 shows execution steps of a method for determining a degradation score and degradation parameter scores according to an embodiment.

FIG. 2 shows execution steps of a method 200 for determining degradation parameter scores and a degradation score using a neural network according to an embodiment. The method 200 is described below as being performed by a server executing machine-readable software code for a neural network. It should be appreciated that some embodiments may include additional, fewer, or different operations than those described in the method 200 and shown in FIG. 2. It should be further appreciated that the various operations of the method 200 may be performed by one or more processors executing of any number of computing devices.

In step 202, the server receives an observed audio signal containing speech originating from a speaker or any device having a microphone. The observed audio signal is generated by a microphone or other device that captures and samples a projected audio wave from a target audio source. The server may receive the observed audio signal over one or more telephony and/or data networks, directly from a calling device or via one or more intermediary devices (e.g., a call center server).

In step 204, the server determines the one or more degradation parameter scores for the observed audio signal according to the neural network architecture, such as those described in FIGS. 3A-3D. The observed audio signal generally is generally the result of the projected audio wave and degradation (e.g., multiplicative noise, additive noise). The effect of the degradation on the projected audio wave may be quantified as degradation parameter scores corresponding to types of degradation parameters (e.g., SNR, T60, DRR). The neural network generates the degradation parameter scores, representing estimations of severity of degradation affecting the projected audio wave.

In optional step 206, the server generates a combined or overall degradation score for the observed audio signal based upon the degradation parameter scores. The degradation score may be generated by algorithmically combining the various degradation parameter scores of the observed audio signal when a downstream application expects or evaluates a single input.

In some cases, the server (or other device) executes a downstream operation that evaluates and/or generates a confidence value that indicates a level of confidence that the content of the observed audio signal was accurately and captured by the microphone, server, or other electronic device. The server may employ the overall degradation score as the confidence value. Additionally or alternatively, the server generates the confidence value based on the overall degradation score or the one or more degradation parameter scores.

In step 208, the server outputs the degradation parameter scores for one or more downstream applications. A downstream application may include any machine-executed operations that assess, employ, or rely upon the observed audio signal and/or the degradation parameter scores. For instance, to increase the accuracy of a downstream voice biometric operation, the downstream application may first reference the degradation parameter scores to mitigate the effects of the degradation parameters on the observed audio signal (e.g., dereverberation processes). The voice biometrics operation may then authenticate the target audio source (e.g., speaker) according to the corrected observed audio signal.

Additionally or alternatively, in some implementations the downstream application (e.g., voice biometric operation, speaker identification operation) uses the degradation parameter scores and/or the degradation score calculated for the speaker (e.g., caller) to qualify a potential voice biometric match between the speaker and an enrollee. The downstream application compares the degradation parameter scores and/or the degradation score of the caller against corresponding values of a table (or other form of data structure or computing file) specifying a range for degradation parameter scores and/or degradation scores denoting high-confidence or low-confidence for input audio samples (e.g., inbound call originating from the speaker). When determining whether the speaker is the enrollee, the downstream application derives the confidence value (qualifying the determination) by referencing the confidence value table according to the degradation parameter scores and/or degradation score calculated for the speaker (e.g., caller).

Additionally or alternatively, in some implementations the downstream application (e.g., voice biometric operation, speaker identification operation) or other machine-executed routine ensures that an optimal audio or biometric feature for an enrollee is stored and used for the downstream application. The downstream operation queries one or more databases or other non-transitory machine-readable storage medium containing the degradation parameter scores and/or the degradation score for audio features and/or biometric features previously calculated for the enrollee. The downstream application can continually update the degradation parameter scores and/or the degradation score for the enrollee or update the enrollee audio signal and/or biometric feature for the enrollee. In operation, after determining that the speaker (e.g., caller, IoT device user) of a new input audio signal (e.g., inbound call, voice command) is the enrollee, the downstream application then compares the degradation parameter scores and/or the degradation score calculated for the new input audio signal against the degradation parameter scores and/or the degradation score previously calculated for the enrollee. If the downstream application determines that the degradation parameter scores and/or the degradation score for the latest input audio signal denotes a comparatively higher quality than the enrollee audio signal (and will therefore yield more accurate matches for future audio samples originated from the same speaker), then the downstream application replaces the current enrollee audio signal or biometric features with the latest input audio or biometric feature the database or storage medium.

In some cases, the downstream application could authenticate or identify the speaker using other techniques. As an example, the downstream application can identify or authenticate the speaker using knowledge-based authentication (KBA) and/or speaker-ownership factors (e.g., security token, device recognition). If the downstream application authenticates or identifies the speaker as the enrollee based upon such alternative techniques, then the downstream application determines whether to update the information stored for the enrollee mentioned above.

As mentioned, in some embodiments the downstream application may use the degradation parameter scores and/or the degradation score to determine the confidence value that indicates the level of confidence that the microphone, server, or other electronic device accurately captured and interpreted the content of the observed audio signal. For example, a downstream speech-to-text application that algorithmically converts recorded speech into a textual dictation may determine whether to add a particular word or phrase based on the confidence value, thereby confirming the likelihood that the speech-to-text algorithm accurately determined the content. The downstream application may compare the confidence value against a predetermined confidence threshold value to determine whether to execute a particular operation (e.g., execute a purchase order in response to a spoken command), based upon the likelihood that the observed audio signals was accurately interpreted.

In some embodiments, the downstream application could coach the target audio source (e.g., speaker) how the user could mitigate the severity of the degradation on the observed audio signal by presenting mitigation solutions via the user GUI. The downstream application will determine that the particular mitigation solution appropriate to present to the user, by determining that a certain type of degradation is undesirably affecting the observed audio signal. The downstream application determines level of the effect of each type of degradation by assessing the corresponding degradation parameters. The downstream application detects that certain types of degradation has overly impacted the observed audio signal when the score of the corresponding degradation parameter satisfies a threshold. The downstream application would then present the speaker with one or more pre-stored prompts instructing the speaker how to reduce the type of degradation, such as suggesting that the speaker move closer to the microphone or speak louder or, if possible, move to a nearby location with less background noise.

C. Illustrative Neural Network Architectures for Parameter Estimation

FIGS. 3A-3D show neural network architectures 300a-300d executed by a server (or other computing device) for determining degradation parameters according to illustrative embodiments. Each architecture 300a-300d is an end-to-end system that ingests audio data of an observed audio signal, extracts features from the observed audio signal, jointly determines the impact of degradation parameters on the observed audio signal, and generates degradation parameter scores representing the severity of degradation. It should, however, be appreciated that embodiments may include additional or alternative operations, or may omit operations, from those shown in FIGS. 3A-3D, yet still fall within the scope of this disclosure. In addition, the neural network architecture 300a-300d may alternate multiple convolutional layers and pooling layers (e.g., first convolutional layer 304, first pooling layer 306, second convolutional layer 308, second pooling layer 310) or consecutively perform multiple convolutional layers and pooling layers.

The neural network architectures 300a-300d employ one or more various high-level feature-extraction representation layers (shown in FIGS. 3A-3D) to extract features from the audio data and generate arrays representing the extracted features. The other layers then evaluate the extracted features to determine the degradation parameter scores. The one or more high-level data-representation extraction layers include any number of techniques for feature extraction and representation typically employed with convolutional neural networks (CNNs), deep neural networks (DNNs), and recurrent neural networks (RNNs), among others.

In some instances, the neural network architecture uses one or more initialized degradation parameter scores when determining the degradation parameter scores.

Figure 3A:
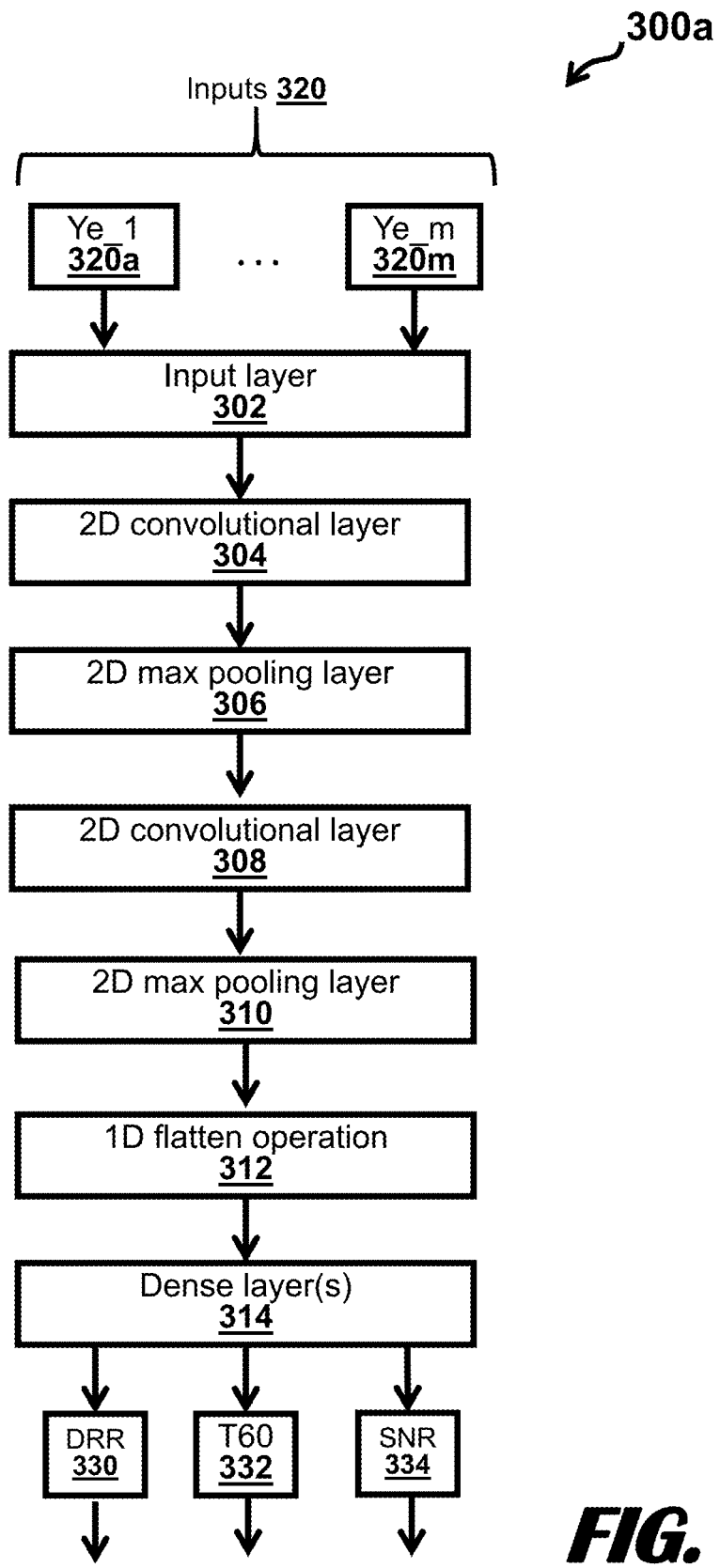
FIG. 3A shows an end-to-end neural network architecture employed by a computing device to determine a degradation score and degradation parameter scores, according to an embodiment.

FIG. 3A shows the layers of an end-to-end neural network architecture 300a executed by a server, according to an embodiment. The neural network architecture 300a jointly determines the degradation parameter scores for three types of degradation parameters (SNR 334, T60 332, DRR 330).

An input layer 302 of neural network architecture 300a ingests one or more arrays 320a-320m as inputs 320, including a first scaled array Ye 1320a up to an $m^{th}$ scaled array Ye_m 320m. The arrays 320a-320m are generated by the server based upon the observed audio signal. In particular, prior to ingestion the server parses the observed audio signal into frames and sub-frames, and transforms the audio data of the frames/sub-frames into a frequency domain or spectrogram representation. The one or more arrays 320a-320m, ingested by the input layer 302, may be representations of the transformed audio data.

The first convolutional layer 304 detects the features of the observed audio signal using the data ingested at the input layer 302. The first convolutional layer 304 convolves a filter and/or kernel with the input 320 according to the dimensions and operations of the filter, thereby generating a feature map of the extracted features. The number of dimensions of the filter is determined based upon the dimensions of the arrays 320a-320m.

The first max-pooling layer 306 (or any other type of pooling layer) detects prominent features. The first max-pooling layer 306 reduces the dimensionality of the feature map to down-sample the feature map for more efficient operation. The first max-pooling layer 306 then detects the prominent features having higher relative values in a pooling window comprising a set of values that is a predetermined length and/or duration. It should be appreciated that the first max-pooling layer 306 is not limited to max pooling and may be any type of pooling layer, such as average pooling.

The second convolutional layer 308 receives the down-sampled feature map and generates a second feature map on the down-sampled feature maps. The second convolutional layer 308 may convolve the same and/or a different filter employed in the first convolutional layer 304 with the down-sampled feature maps, thereby generating the second feature map.

The second max pooling layer 310 (or other type of pooling layer) down-samples the second feature map from the second convolutional layer 308 to detect the prominent features. The second max-pooling layer 310 may apply the same or a different type of pooling layer as in the first max pooling 306. The second max-pooling layer 310 reduces the dimensionality of the features maps to down-sample the feature map for more efficient operation. The max-pooling layer 306 then detects the prominent features having higher relative values in a pooling window comprising a set of values that is a predetermined length and/or duration.

The neural network architecture 300a performs a flattening operation 312 on the down-sampled feature map from the second max pooling layer 310, which flattens the down-sampled feature map. The flattening operation 312 arranges the down-sampled feature map (represented as an array) into one-dimensional vectors, thereby easing the computational burdens of the device executing the neural network architecture 300a.

The one-dimensional vectors are fed into various neurons of the dense layer(s) 314 and the optional hidden layers (not shown) within the dense layer(s) 314. The neurons in the dense layer(s) 314 may connect to other neurons in the dense layer(s) 314 via algorithmic weights. The server optimizes the algorithmic weights during training such that the dense layer(s) 314 learn the relationship of the degradation parameters according to the features extracted from the observed audio signal (the one-dimensional vector). During deployment (sometimes referred to as "testing"), the dense layer(s) 314 employs the trained relationships of the degradation parameters to determine degradation parameter scores DDR 330, T60 332 and SNR 334.

Figure 3B:
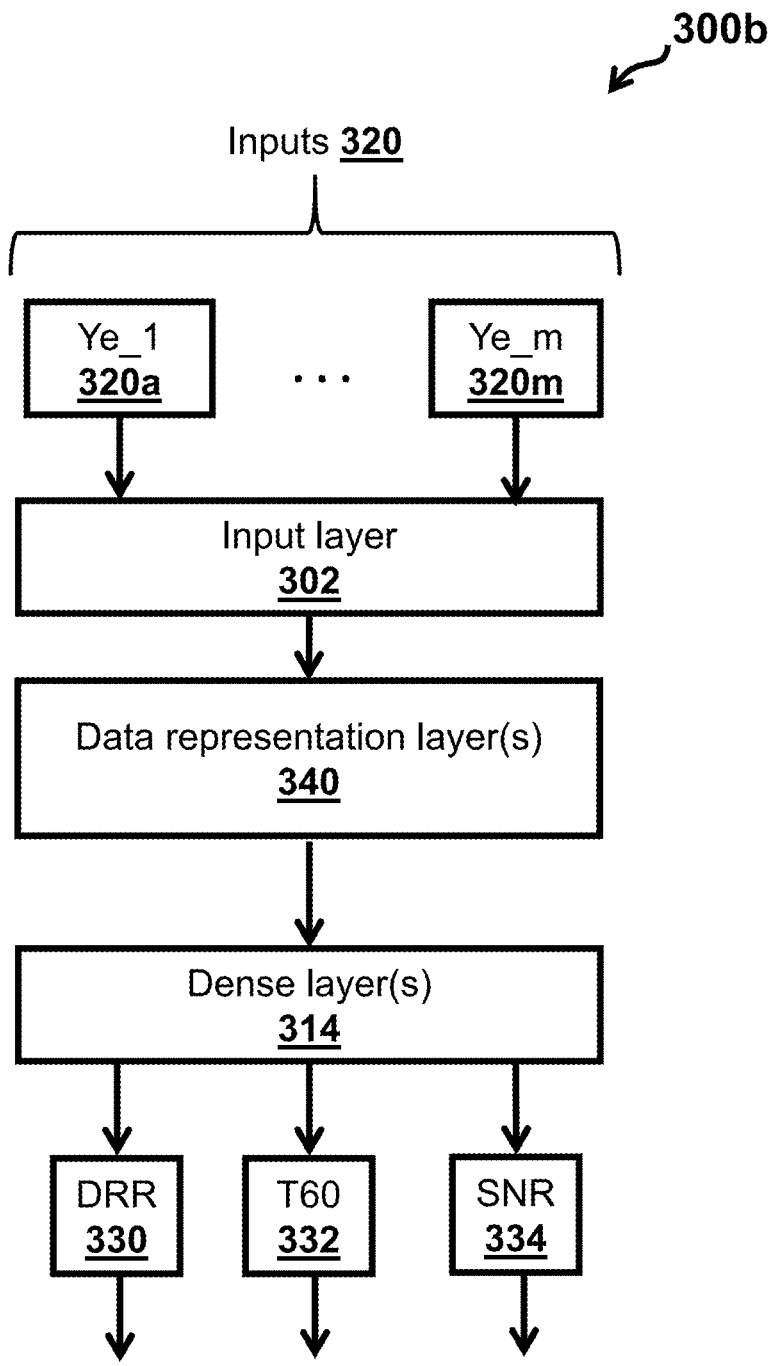
FIG. 3B shows an end-to-end neural network architecture employed by a computing device to determine a degradation score and degradation parameter scores, according to an embodiment.

FIG. 3B shows the layers of an end-to-end neural network architecture 300b executed by a server, according to an embodiment. The neural network architecture 300b jointly determines the degradation parameter scores for three types of degradation parameters (SNR 334, T60 332, DRR 330).

An input layer 302 of neural network architecture 300a ingests one or more arrays 320a-320m as inputs 320, including a first scaled array Ye 1320a up to an $m^{th}$ scaled array Ye_m 320m. The arrays 320a-320m are generated by the server based upon the observed audio signal. In particular, prior to ingestion the server parses the observed audio signal into frames and sub-frames, and transforms the audio data of the frames/sub-frames into a frequency domain or spectrogram representation. The one or more arrays 320a-320m ingested by the input layer 302 represent the transformed audio data.

One or more high-level data representation layers (data representation layer(s) 340) extract features from the inputs 320. The data representation layer(s) 340 may comprise several layers, such as the convolutional layers 304, 308, and the pooling layers 306, 310 shown in FIG. 3A, among others. A purpose of the data representation layer(s) 340 is to extract features of the data and determine the intrinsic structure of the data. The data representation layer(s) 340 may include a number of techniques for data extraction and representation, such as one or more convolutional layers, pooling layers, and the like.

The extracted features from the one or more data representation layer(s) 340 are fed to dense layer(s) 314 and the optional hidden layers (not shown) within the dense layer(s) 314. The neurons in the dense layer(s) 314 may connect to other neurons in the dense layer(s) 314 via algorithmic weights. The server optimizes the algorithmic weights during training such that the dense layer(s) 314 learns the relationship of the degradation parameters according to the features extracted from the observed audio. During deployment (sometimes referred to as "testing"), the dense layer(s) 314 employs the trained relationships of the degradation parameters to determine degradation parameter scores DDR 330, T60 332 and SNR 334.

The dense layer(s) 314 output jointly determined degradation parameters DRR 330, T60 332, SNR 334. The parameters are considered jointly determined because they are determined simultaneously (in one end-to-end instance), allowing the server to account for the interplay of the degradation parameters during the server's determination of the parameters.

Figure 3C:
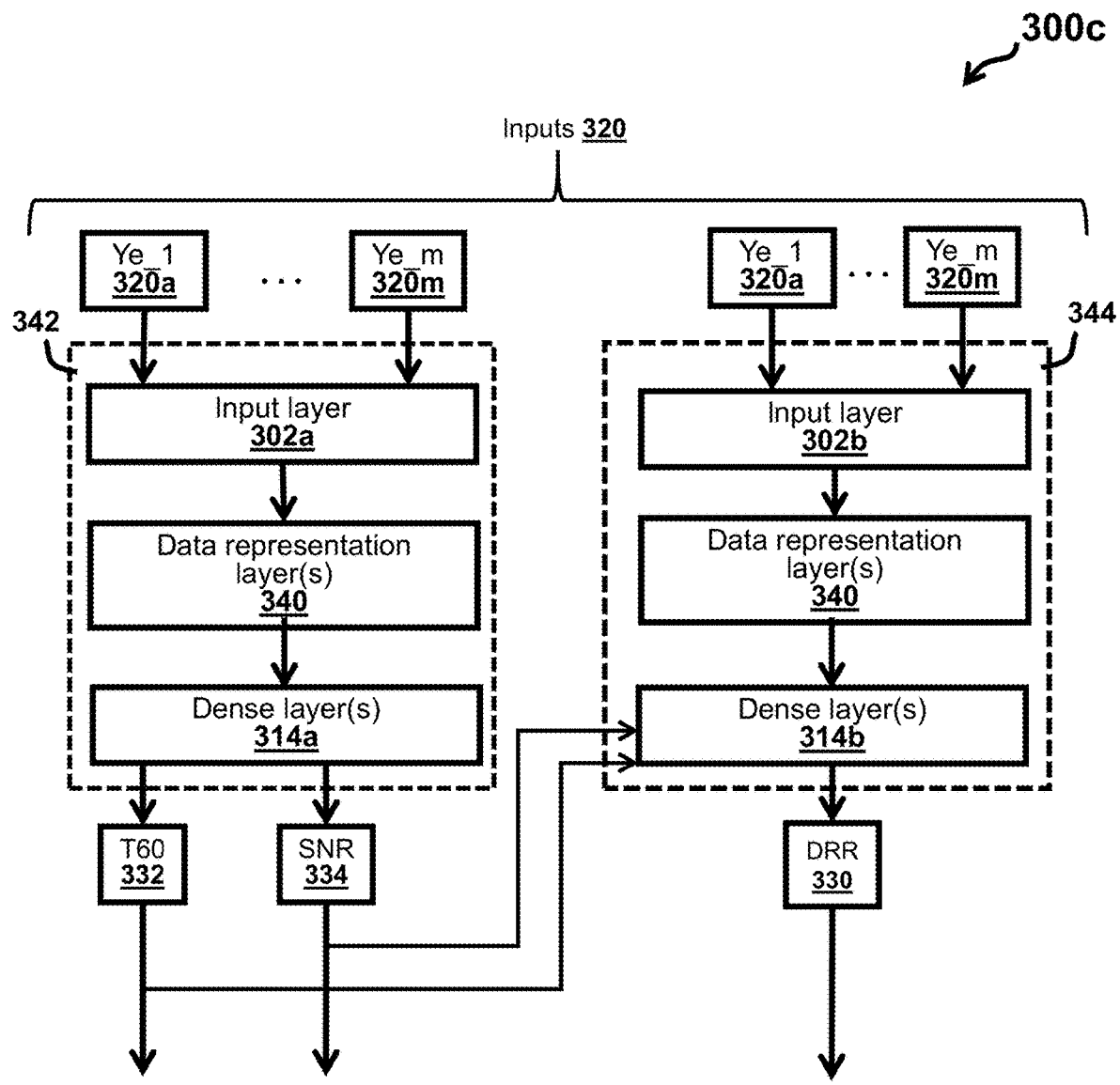
FIG. 3C shows an end-to-end neural network architecture employed by a computing device to determine a degradation score and degradation parameter scores, according to an embodiment.

FIG. 3C shows the layers of an end-to-end neural network architecture 300c executed by a server, according to an embodiment. The neural network architecture 300c jointly determines the degradation parameter scores for three types of degradation parameters (SNR 334, T60 332, DRR 330). The neural network architecture 300c determines the degradation parameter scores T60 332, SNR 334, DRR 330 in separate sets of layers (represented as estimators 342, 344) that are applied to the inputs 320 generated from the observed audio signal.

A first estimator 342 of neural network architecture 300c applies an input layer 302a, one or more data representation layer(s) 340, and a dense layer(s) 314a to determine the degradation parameter scores for T60 332 and SNR 334. The input layer 302a is configured to receive 320a-320m as inputs 320. The dense layer(s) 314a is trained to determine scores for T60 332 and SNR 334. A second estimator 344 applies an input layer 302b, the data representation layer(s) 340, and a dense layer(s) 314b to determine the degradation parameter scores for DRR 330. The input layer 302b is configured to receive as inputs the arrays 320a-320m as inputs 320 and the degradation parameter scores for T60 332 and SNR 334. The dense layer(s) 314b is trained to determine scores for the DRR 330. The data representation layer(s) 340 are the same for each estimator 342, 344, though the data representation layer(s) 340 may be different in some embodiments. In some embodiments, degradation parameter score DRR 330 is an input in the input layer 302a.

An input layer 302a of neural network architecture 300c ingests one or more arrays 320a-320m as inputs 320, including a first scaled array Ye 1320a up to an $m^{th}$ scaled array Ye_m 320m. The arrays 320a-320m are generated by the server based upon the observed audio signal. In particular, prior to ingestion the server parses the observed audio signal into frames and sub-frames, and transforms the audio data of the frames/sub-frames into a frequency domain or spectrogram representation. The one or more arrays 320a-320m ingested by the input layer 302a represent the transformed audio data.

One or more high-level data representation layers (data representation layers 340) extract features from the inputs 320 of the first estimator 342. The one or more data representation layers 340 may comprise several layers, such as the convolutional layers 304, 308, and the pooling layers 306, 310 shown in FIG. 3A, among others. A purpose of the one or more data representation layers 340 is to extract features of the data and determine the intrinsic structure of the data. The data representation layer(s) 340 may include a number of techniques for data extraction and representation, such as one or more convolutional layers pooling layers, and the like.

The extracted features from the data representation layer(s) 340 are fed to a dense layer(s) 314a of the first estimator 342 and the optional hidden layers (not shown) within the dense layer(s) 314a. The neurons in the dense layer(s) 314a may connect to other neurons in the dense layer(s) 314a via algorithmic weights. The server optimizes the algorithmic weights during training such that the dense layer(s) 314a learns the relationship of the degradation parameters according to the features extracted from the observed audio signal. During deployment (sometimes referred to as "testing"), the dense layer(s) 314a employs the trained relationships of the degradation parameters to determine degradation parameter scores T60 332 and SNR 334

The outputs of the dense layer(s) 314a of the first estimator 342 are the degradation parameter scores T60 332 and SNR 334. As discussed herein, the advantage of estimating these parameters first, within the neural network architecture 300c, is passing down the dependencies of SNR 334, and T60 332 determined from the first estimator 342 to reliably determine the DDR 330 degradation parameter score in the second estimator 344.

An input layer 302b of neural network architecture 300c ingests one or more arrays 320a-320m as inputs 320, including a first scaled array Ye 1320a up to an $m^{th}$ scaled array Ye_m 320m. The server generates arrays 320a-320m based upon the observed audio signal. In particular, prior to ingestion the server parses the observed audio signal into frames and sub-frames, and transforms the audio data of the frames/sub-frames into a frequency domain or spectrogram representation. The one or more arrays 320a-320m ingested by the input layer 302a represent the transformed audio data. The input layer 302b may be similar in operation to the input layer 302a One or more high-level data representation layers (data representation layer(s) 340) of the second estimator 344 extract features from the inputs 320. The data representation layer(s) 340 may comprise several layers, such as the convolutional layers 304, 308, and the pooling layers 306, 310 shown in FIG. 3A, among others. A purpose of the one or more data representation layers 340 is to extract features of the data and determine the intrinsic structure of the data.

The data representation layer(s) 340 may include a number of techniques for data extraction and representation, such as one or more convolutional layers, pooling layers, and the like. In some embodiments, the data representation layers 340 in the first estimator 342 and the second estimator 344 comprise the same layers in the same (or different) order. In other embodiments, the data representation layers 340 in the first estimator 342 and the second estimator 344 comprise different layers. In other embodiments, the data representation layers 340 in the first estimator 342 and the second estimator 344 comprise the some combination of the same and different layers.

The extracted features from the data representation layer(s) 340 and the degradation parameter scores T60 332 and SNR 334 from dense layer(s) 314a in the first estimator 342 are fed to a dense layer(s) 314b of the second estimator 344 and the optional hidden layers (not shown) within the dense layer(s) 314b. The neurons in the dense layer(s) 314b may connect to other neurons in the dense layer(s) 314b via algorithmic weights. The server optimizes the algorithmic weights during training such that the dense layer(s) 314b learns the relationship of the degradation parameters according to the features extracted from the observed audio signal. During deployment (sometimes referred to as "testing"), the dense layer(s) 314b employs the trained relationships of the degradation parameters to determine degradation parameter scores DRR 330.

The output of dense layer(s) 314b of the second estimator 344 is the degradation parameters DDR 330. As discussed herein, the advantage of determining DDR 330 parameter second, within the neural network architecture 300c, is using the dependencies of T60 332 and SNR 334 to reliably determine the DDR 330 degradation parameter score.

Architecture 3

Figure 3D:
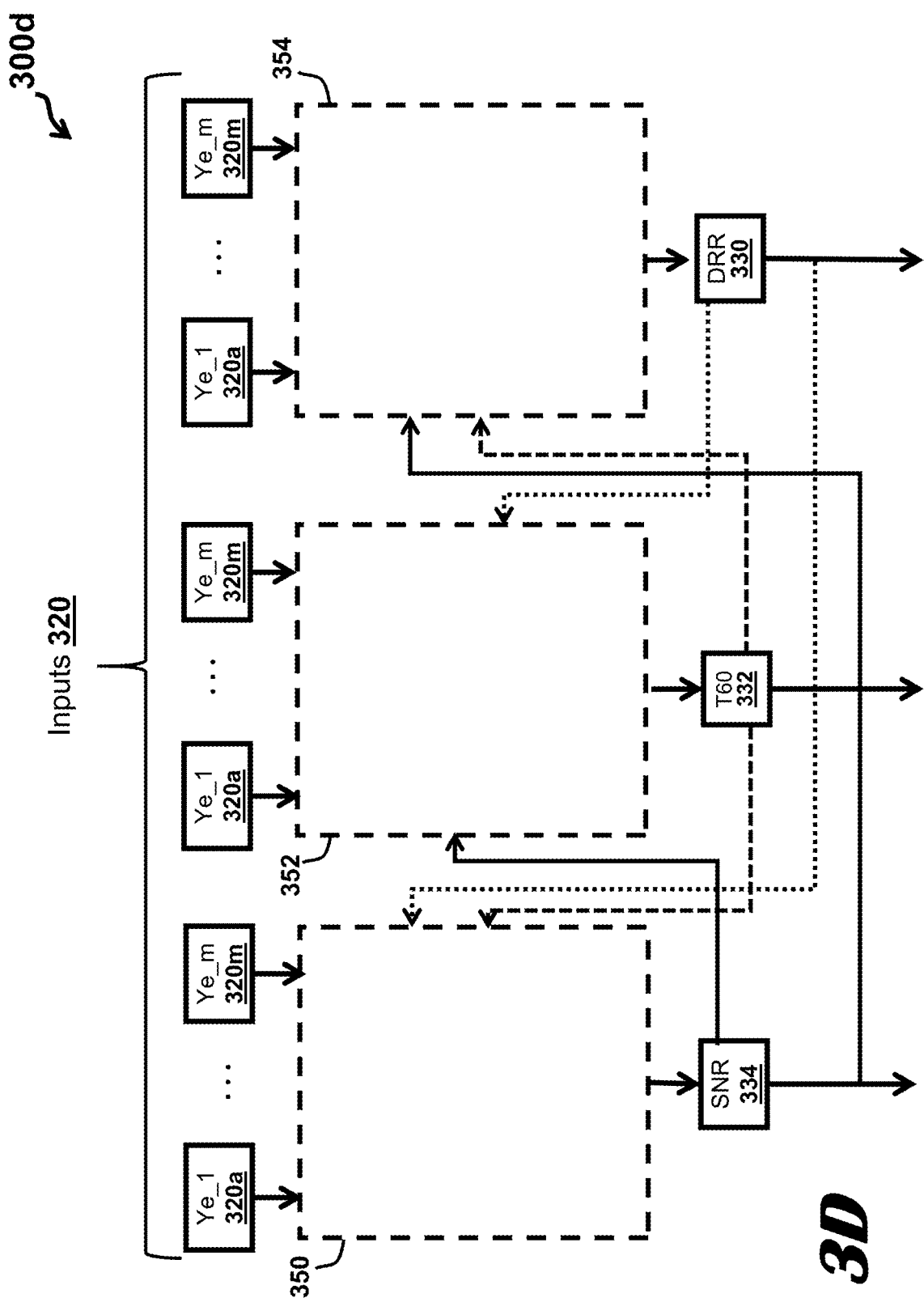
FIG. 3D shows a neural network end-to-end architecture employed by a computing device to determine degradation parameters, according to an embodiment.

FIG. 3D shows the layers of an illustrative end-to-end neural network architecture 300d executed by a server, according to an embodiment. The neural network architecture 300d jointly determines degradation parameter scores for three types of degradation parameters (SNR 334, T60 332, and DRR 330). The neural network architecture 300d determines the degradation parameter scores T60 332, SNR 334, DRR 330 in separate sets of layers (represented as estimators 350, 352, 354) that are applied to the inputs 320 generated from the observed audio signal.

A first estimator 350 of neural network architecture 300d applies (not shown) an input layer, data-representation extraction layer(s), and one or more dense layers to determine the degradation parameter score SNR 334. The input layer is configured to receive 320a-320m as inputs 320. The dense layer(s) are trained to determine scores for SNR 334 based on the inputs 320 and the degradation parameter scores T60 332 and DRR 330. A second estimator 352 applies (not shown) an input layer, data representation extraction layer(s), and one or more dense layers to determine the degradation parameter score T60 332. The input layer is configured to receive 320a-320m as inputs 320. The dense layer(s) are trained to determine scores for T60 332 based on the inputs 320 and the degradation parameter scores SNR 334 and DRR 330. A third estimator 354 applies an input layer, data-representation extraction layer(s), and one or more dense layers to determine the degradation parameter score DRR 330. The input layer is configured to receive 320a-320m as inputs 320. The one or more dense layers are trained to determine scores for DRR 330 based on inputs 320 and the degradation parameter scores T60 332 and SNR 334.

The input layers (not shown) of neural network architecture 300d ingests one or more arrays 320a-320m as inputs 320, including a first scaled array Ye_1 320a up to an $m^{th}$ scaled array Ye_m 320m. The first estimator 350, second estimator 352, and third estimator 354 also ingest T60 332 and DRR 330, SNR 334 and DRR 330, SNR 334 and T60 332 respectively. Each degradation parameter is determined by a dedicated estimator, which feed one or more outputs (e.g., degradation parameter score) to the other two estimators. The arrays 320a-320m are generated by the server based upon the observed audio signal. In particular, prior to ingestion the server parses the observed audio signal into frames and sub-frames, and transforms the audio data of the frames/sub-frames into a frequency domain or spectrogram representation. The one or more arrays 320a-320m ingested by the input layer represent the transformed audio data.

One or more high-level data representation layers (not shown) extract features from the inputs 320. The data representation layer(s) may comprise several layers, such as the convolutional layers 304, 308, and the pooling layers 306, 310 shown in FIG. 3A, among others. A purpose of the one or more data representation layers is to extract features of the data and determine the intrinsic structure of the data. The data representation layer(s) may include a number of techniques for data extraction and representation, such as one or more convolutional layers, pooling layers, and the like.

The extracted features from the data representation layer(s) are fed to the one or more dense layers (not shown) of each of the estimators 350, 352, 354 respectively and the optional hidden layers within each the dense layers in of each of the estimators 350, 352, 354 respectively. The neurons in the one or more dense layer mays connect to other neurons in the one or more dense layers via algorithmic weights. The server optimizes the algorithmic weights during training such that the one or more dense layers learn the relationship of the degradation parameters according to the features extracted from the observed audio signal. During deployment (sometimes referred to as "testing"), the one or more dense layers employ the trained relationships of the degradation parameters to determine degradation parameter scores SNR 334, T60 332, and DRR 330 from each of the estimators 350, 352, 354 respectively.

D. Illustrative Method for Pre-Processing

Figure 4:
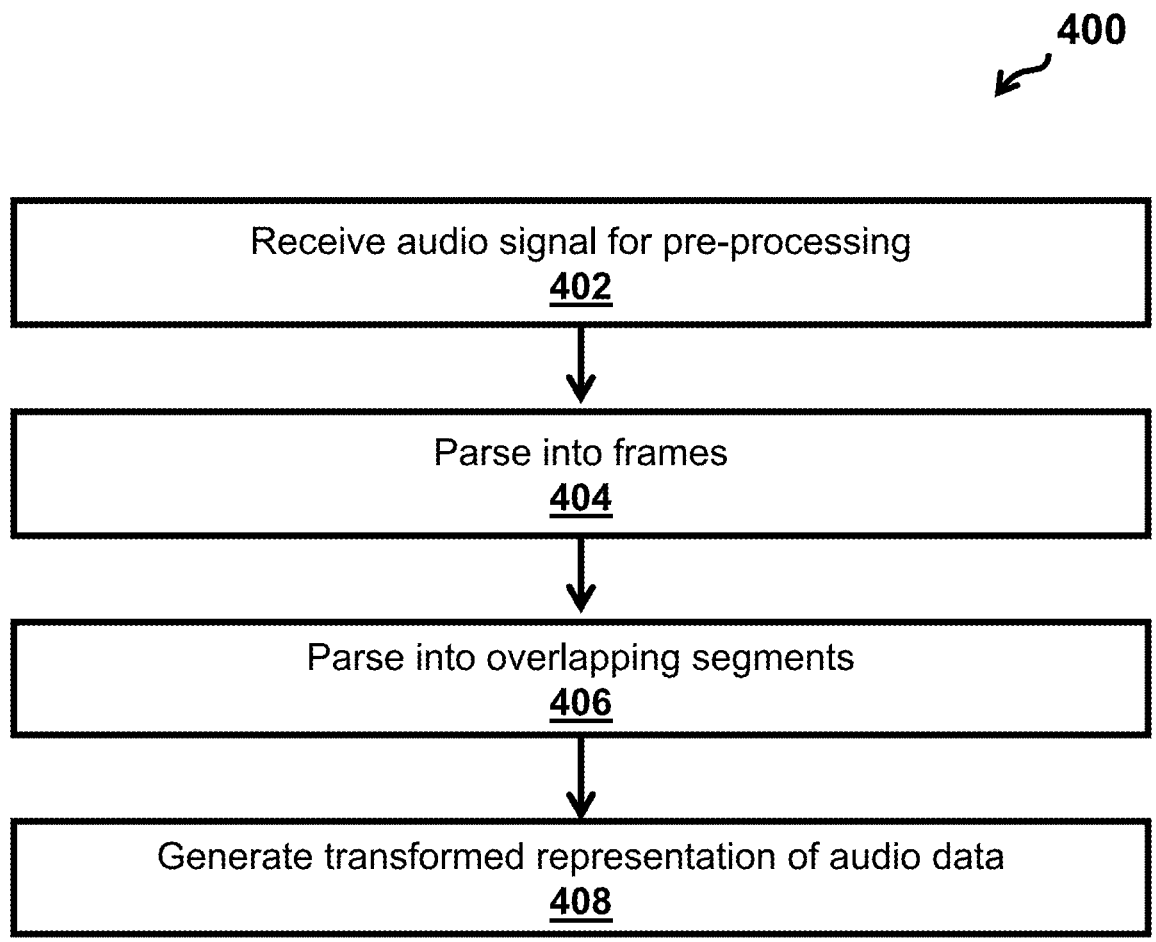
FIG. 4 shows execution steps of a method for pre-processing audio data, according to an embodiment.

FIG. 4 shows execution steps of a method 400 executed by a server, for pre-processing audio data to be fed into a neural network architecture, according to an embodiment. It should be appreciated that some embodiments may include additional, fewer, or different operations and still fall within the scope of the disclosure. The illustrative method 400 of FIG. 4 is shown and described as being performed by a single server, but the potential embodiments are not limited as such. It should be appreciated that the operations of the illustrative method 400 may be performed by one or more processors of any number of computing devices.

In step 402, the server receives an observed audio signal for pre-processing. In some embodiments, the server receives the observed audio signal from a microphone of a calling device. In other embodiments, the server receives the observed audio signal from a different server (e.g., a call center server). The observed audio signal may be a time series signal containing speech. The observed audio signal may be a signal comprising various components including a projected audio wave (e.g., physical representation of an audio signal from a target audio source), and may be impacted by background noise and/or reverberation. The various components of the observed audio signal determine the audio data represented by the observed audio signal.

In step 404, the server parses the observed audio signal into any number of audio frames of a particular length or duration. Audio frames can be constructed based on sampling the observed audio signal to retrieve audio data from the sampled observed audio signal For instance, an audio signal may be sampled at a sampling rate of $f_s$ samples per second to retrieve $f_s$ samples of audio data from the audio signal in one second. An administrator user may configure the server to parse the frames to have a fixed duration (e.g., 1 sec).

In step 406, the server parses the frames generated from step 404 into overlapping adjacent sub-frames such that the frames overlap each other by some fixed amount. The overlap may be configured by a user or dynamically determined by the server. In some cases, each of the sub-frames has a fixed length across a time series, where the length may be pre-established or dynamically determined. The sub-frames of the frame may have the fixed length, where successive sub-frames may overlap by some amount across the time series. For example, the server may sample a 2 ms overlap.

In step 408, the server generates one or more transformed representations of the audio data received in the observed audio signal. For instance, the server may transform the audio data represented in the time domain into a frequency domain representation by performing a FFT.

In some implementations, the server may transform the audio data by employing a scaling function to accentuate areas of interest in the audio data. For example, the audio data containing speech from the target audio source may be accentuated while frames and sub-frames containing silence, noise, or not speech from the target audio may not be accentuated. In some implementations, the server will further scale or normalize the audio data according to a scaling or normalization operation.

In some implementations, the server may transform the frames and sub-frames containing audio data with a spectral resolution and time domain resolution into an array containing sampled audio data according to the spectral resolution and time domain resolution.

E. Illustrative Methods for Data Generation and Model Training

Figure 5:
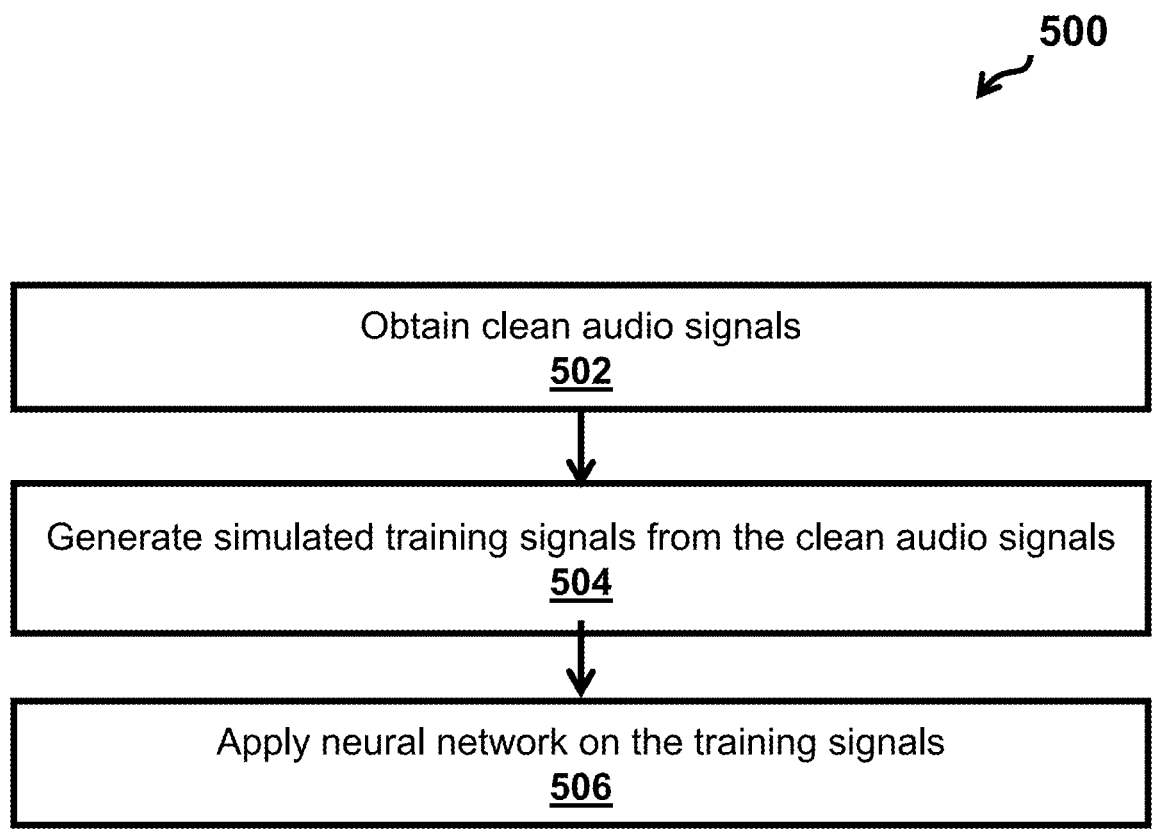
FIG. 5 shows execution steps of a method for training a neural network, according to an embodiment.

FIG. 5 shows execution steps of a method 500 for training a neural network architecture according to an embodiment. It should be appreciated that some embodiments may include additional, fewer, or different execution steps. Although the illustrative method 500 is described as being performed by a server, it should be further appreciated that some or all operations of the illustrative method 500 may be performed by any number of processors of any number of computing devices (e.g., servers, desktop computers, laptop computers). Some embodiments may include additional, fewer, or different steps. The steps may be re-ordered, added, removed, or repeated and still fall within the scope of the disclosure.

The server applies the neural network architecture to training audio signals (e.g., clean audio signals, simulated audio signals, previously received observed audio signals) that are associated with a labels indicating the degradation parameter scores. In some instances, before applying the neural network architecture on the training audio signals during a training phase, the server pre-processes the training audio signals according to various pre-processing operations described herein, such that the neural network architecture receives arrays representing portions of the training audio signals. In some instances, the server applies initialized degradation parameter scores to the neural network architecture during the training phase.

In step 502, the server obtains the clean audio signals from one or more speech corpora. The clean audio signals may include speech originating from a speaker with little or no degradation (e.g., additive noise, multiplicative noise). The clean audio signals may be stored in non-transitory storage media accessible to the server or received via a network or other data source. In some circumstances, the server generates a simulated clean audio signal using simulated audio signals. For example, the server may generate a simulated clean audio signal by simulating speech.

In step 504, the server generates training audio signals by degrading the clean audio signals. The server may generate training audio signals by applying additive noise and/or multiplicative noise to the clean audio signals and labeling the training audio signal with information associated with the applied additive noise and/or multiplicative noise (e.g., degradation parameter scores). The additive noise may be simulated white Gaussian noise or other simulated noises with different spectral shapes, and/or example sources of backgrounds noise (e.g., real babble noise, real white noise, and other ambient noise). The multiplicative noise may be simulated acoustic impulse responses.

In step 506, the server uses the training audio signals to train one or more neural network architectures. As discussed herein, the net result of training the neural network architecture is to minimize the error of the predicted output (degradation parameter score output generated by the neural network architecture) and the expected output (labeled degradation parameter scores associated with the training audio signals).

The training audio signal is fed to the neural network architecture, which the neural network architecture uses to generate the predicted output by applying the current state of the neural network architecture on the training audio signal. The error between the predicted output and expected output is determined by comparing the difference between the predicted output and expected output.

The server adjusts the algorithmic weights in the neural network architecture until the error between the predicted output and expected output is small enough such that the error is within a predetermined acceptable margin of error. Additionally or alternatively, the server adjusts the algorithmic weights based upon a predetermined number of training iterations and/or batches.

An example algorithm the server may employ to train the neural network architecture using the error between the predicted output and expected output is the backpropagation algorithm. The backpropagation method operates by propagating the error calculated at the output of the neural network architecture each iteration, batch and/or epoch through all of the algorithmic weights in the neural network architecture such that the algorithmic weights adapt based on the amount of error.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The actual software code or specialized control hardware used to implement these systems and methods is not limiting of the invention. Thus, the operation and behavior of the systems and methods were described without reference to the specific software code being understood that software and control hardware can be designed to implement the systems and methods based on the description herein.

When implemented in software, the functions may be stored as one or more instructions or code on a non-transitory computer-readable or processor-readable storage medium. The steps of a method or algorithm disclosed herein may be embodied in a processor-executable software module, which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used herein, include compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

While various aspects and embodiments have been disclosed, other aspects and embodiments are contemplated. The various aspects and embodiments disclosed are for purposes of illustration and are not intended to be limiting, with the true scope and spirit being indicated by the following claims.

What is claimed is:

1. A computer-implemented method for end-to-end acoustic degradation estimation from an audio signal comprising:
   training, by a computer, a neural network architecture by applying the neural network architecture on a plurality of simulated audio signals having one or more types of degradation, the neural network architecture comprising a plurality of sets of one or more layers to generate a corresponding degradation parameter score;
   receiving, by the computer, an input audio signal originating from a speaker; and
   generating, by the computer, a plurality of degradation parameter scores for the input audio signal based upon a plurality of degradation parameters corresponding to a type of degradation by applying the neural network architecture to the input audio signal,
   wherein a first degradation parameter score of the plurality of degradation parameter scores is output by a first set of one or more layers of the neural network architecture and fed to a second set of one or more layers of the neural network architecture to generate a second degradation parameter score of the plurality of degradation parameter scores.

2. The method according to claim 1, wherein training the neural network architecture further comprises applying the neural network architecture on one or more clean audio signals.

3. The method according to claim 1, further comprising generating, by the computer, the plurality of simulated audio signals using a clean audio signal by applying at least one type of degradation on the clean audio signal.

4. The method according to claim 1, wherein the neural network architecture is trained according to the plurality of simulated audio signals and corresponding labels, each respective label indicating a degradation parameter for the type of degradation applied to produce the respective simulated audio signal.

5. The method according to claim 1, further comprising determining, by the computer executing the neural network architecture, a degradation score based upon the plurality of degradation parameter scores.

6. The method according to claim 1, further comprising determining, by the computer, that an inbound call originated from a registered caller in response to determining that the plurality of degradation parameter scores satisfy one or more thresholds.

7. The method according to claim 1, further comprising:
   determining, by the computer, a confidence value for the input audio signal based upon the plurality of degradation parameter scores; and
   executing, by the computer, a downstream operation based upon the confidence value.

8. The method according to claim 1, further comprising determining, by the computer, a degradation mitigation action based upon the plurality of degradation parameter scores.

9. The method according to claim 1, wherein the neural network architecture comprises a plurality of estimators comprising a corresponding set of one or more layers for generating a degradation score for the type of degradation, and
   wherein the neural network architecture generates the plurality of degradation parameter scores by successively applying each estimator, and wherein a second estimator uses as input a degradation parameter score generated from a first estimator.

10. The method according to claim 1, wherein a type of degradation parameter includes at least one of: a reverberation time, an early to late reverberation ratio, and a signal-to-noise ratio.

11. A system comprising:
    a computing device comprising a processor and a non-transitory storage medium configured to store a plurality of computer program instructions that when executed by the processor:
      train a neural network architecture by applying the neural network architecture on a plurality of simulated audio signals having one or more types of degradation, the neural network architecture comprising a plurality of sets of one or more layers trained to generate a corresponding degradation parameter score;
      receive an input audio signal originating from a speaker; and
      generate a plurality of degradation parameter scores for the input audio signal based upon a plurality of degradation parameters corresponding to a type of degradation by applying the neural network architecture to the input audio signal,
      wherein a first degradation parameter score of the plurality of degradation parameter scores is output by a first set of one or more layers of the neural network architecture and fed to a second set of one or more layers of the neural network architecture to generate a second degradation parameter score of the plurality of degradation parameter scores.

12. The system according to claim 11, wherein the neural network architecture is further trained by applying the neural network architecture on one or more clean audio signals.

13. The system according to claim 11, wherein the processor of the computing device is configured to generate the plurality of simulated audio signals using a clean audio signal by applying at least one type of degradation on the clean audio signal.

14. The system according to claim 11, wherein the neural network architecture is trained according to the plurality of simulated audio signals and corresponding labels, each respective label indicating a degradation parameter for the type of degradation applied to produce the respective simulated audio signal.

15. The system according to claim 11, wherein the processor of the computing device is configured to determine a degradation score based upon the plurality of degradation parameter scores.

16. The system according to claim 11, wherein the processor of the computing device is configured to determine that an inbound call originated from a registered caller in response to determining that the plurality of degradation parameter scores satisfy one or more thresholds.

17. The system according to claim 11, wherein the processor of the computing device is configured to:
    determine a confidence value for the input audio signal based upon the plurality of degradation parameter scores; and execute a downstream operation based upon the confidence value.

18. The system according to claim 11, wherein the processor of the computing device is configured to determine a degradation mitigation action based upon the plurality of degradation parameter scores.

19. The system according to claim 11, wherein the neural network architecture comprises a plurality of estimators comprising a corresponding set of one or more layers for generating a degradation score for the type of degradation, and wherein the neural network architecture generates the plurality of degradation parameter scores by successively applying each estimator, and wherein a second estimator uses as input a degradation parameter score generated from a first estimator.

20. The system according to claim 11, wherein the computing device is at least one of an Internet of Things device, a server, and a caller device.

\* \* \* \* \*